US012586271B2

(12) United States Patent     (10) Patent No.:   US 12,586,271 B2

Aggarwal et al.     (45) Date of Patent:    Mar. 24, 2026

(54) COLOR CONDITIONED DIFFUSION PRIOR

(71) Applicant: ADOBE INC., San Jose, CA (US)

(72) Inventors: Pranav Vineet Aggarwal, Santa Clara, CA (US); Venkata Naveen Kumar Yadav Marri, Newark, CA (US); Midhun Harikumar, Sunnyvale, CA (US); Sachin Madhav Kelkar, Santa Clara, CA (US); Hareesh Ravi, San Jose, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 232 days.

(21) Appl. No.: 18/329,111

(22) Filed: Jun. 5, 2023

(65) Prior Publication Data

US 2024/0404144 A1     Dec. 5, 2024

(51) Int. Cl.
    *G09G 5/00*        (2006.01)
    *G06F 40/40*      (2020.01)
    (Continued)

(52) U.S. Cl.
    CPC .............. *G06T 11/60* (2013.01); *G06F 40/40* (2020.01); *G06N 3/045* (2023.01); *G06N 3/08* (2013.01); *G06T 11/001* (2013.01)

(58) Field of Classification Search
    CPC ......... G06T 11/60; G06T 19/00; G06T 11/00; G06T 11/20; G06T 11/206; G06T 7/0012; G06T 2207/10081; G06T 2207/30004; G06T 11/203; G06T 2211/441; G06T 2210/28; G06T 11/001; G06F 9/4443; G06F 3/0481; G06F 30/13; G06F 3/04845; G06F 3/04883; G06F 40/143; G06F 16/54; G06F 16/56; G06F 16/5838; G06F 16/58; G06F 16/55; G06F 40/40; G06V 20/20; G06V 10/7753; G11B 27/10;

(Continued)

(56) References Cited

U.S. PATENT DOCUMENTS

| | | | |
|---|---|---|---|
| 10,713,821 B1 * | 7/2020 | Surya ..................... | G06N 3/045 |
| 11,216,505 B2 | 1/2022 | Motiian et al. | |

(Continued)

OTHER PUBLICATIONS

1Li, et al., "Universal Style Transfer via Feature Transforms", 31st Conference on Neural Information Processing Systems (NIPS 2017), 11 pages.

(Continued)

*Primary Examiner* — Gordon G Liu

(74) *Attorney, Agent, or Firm* — F. CHAU & ASSOCIATES, LLC

(57) ABSTRACT

Systems and methods for image processing are described. Embodiments of the present disclosure, via a multi-modal encoder of an image processing apparatus, encodes a text prompt to obtain a text embedding. A color encoder of the image processing apparatus encodes a color prompt to obtain a color embedding. A diffusion prior model of the image processing apparatus generates an image embedding based on the text embedding and the color embedding. A latent diffusion model of the image processing apparatus generates an image based on the image embedding, where the image includes an element from the text prompt and a color from the color prompt.

20 Claims, 15 Drawing Sheets

(51) Int. Cl.

| | |
|---|---|
| *G06N 3/045* | (2023.01) |
| *G06N 3/08* | (2023.01) |
| *G06T 11/00* | (2006.01) |
| *G06T 11/60* | (2006.01) |

(58) Field of Classification Search
CPC .. H04N 21/47217; G16H 30/20; G06N 20/20; G06N 3/045; G06N 3/047; G06N 3/08; G06Q 30/0643
USPC .......................................................... 345/619
See application file for complete search history.

(56) References Cited

U.S. PATENT DOCUMENTS

| | | | | |
|---|---|---|---|---|
| 11,922,550 | B1 * | 3/2024 | Ramesh ................ | G06F 40/284 |
| 11,995,803 | B1 | 5/2024 | Karpman et al. | |
| 2011/0069325 | A1 * | 3/2011 | Kawashima ........... | H04N 1/603 |
| | | | | 358/1.1 |
| 2022/0343561 | A1 * | 10/2022 | Aggarwal ............. | G06T 11/001 |
| 2023/0118966 | A1 | 4/2023 | Liu et al. | |
| 2024/0112088 | A1 | 4/2024 | Yu et al. | |
| 2024/0153152 | A1 | 5/2024 | Liu et al. | |
| 2024/0185035 | A1 | 6/2024 | Yu et al. | |
| 2024/0282131 | A1 | 8/2024 | Ren et al. | |
| 2024/0303764 | A1 | 9/2024 | Pang et al. | |
| 2024/0331235 | A1 * | 10/2024 | Smock ................... | G16C 20/70 |

OTHER PUBLICATIONS

2Radford, et al., "Learning Transferable Visual Models From Natural Language Supervision", In International Conference on Machine Learning (pp. 8748-8763), PMLR, arXiv preprint: arXiv:2103.00020v1 [cs.CV] Feb. 26, 2021.
3Bramesh, et al., "Hierarchical Text-Conditional Image Generation with CLIP Latents", arXiv preprint: arXiv:2204.06125v1 [cs.CV] Apr. 13, 2022, 27 pages.
4Rombach, et al., "High-Resolution Image Synthesis with Latent Diffusion Models", In Proceedings of the IEEE/CVF Conference on Computer Vision and Pattern Recognition (pp. 10684-10695), arXiv preprint: arXiv:2112.10752v2 [cs.CV] Apr. 13, 2022.
5Saharia, et al., "Photorealistic Text-to-Image Diffusion Models with Deep Language Understanding", arXiv preprint: arXiv:2205.11487v1 [cs.CV] May 23, 2022, 46 pages.
7Align: Scaling Up Visual and Vision-Language Representation Learning With Noisy Text Supervision. Tuesday, May 11, 2021. Posted by Chao Jia and Yinfei Yang, Software Engineers, Google Research. Found on the internet at: https://ai.googleblog.com/2021/05/align-scaling-up-visual-and-vision.html.
8GitHub—FreddeFrallan/Multilingual-CLIP: OpenAI CLIP text encoders for multiple languages, 7 pages. Found on the Internet, https://github.com/FreddeFrallan/Multilingual-CLIP#readme.
Office Action dated Jun. 3, 2025 in related U.S. Appl. No. 18/296,002.
Office Action dated Aug. 14, 2025 in related U.S. Appl. No. 18/296,002.
Office Action dated May 19, 2025 in related U.S. Appl. No. 18/301,671.

* cited by examiner

Pixel Space 310

305

315 $\mathcal{E}$

320

Latent Space 325

Forward Diffusion Process 330

335

360

365

370

Guidance Space 375

340

Reverse Diffusion Process

345

350 $D$

355

300

Initialize untrained model ⌐1205

Add noise to training image using forward diffusion process in N stages ⌐1210

At each stage n, starting with stage N, predict image for stage n - 1 ⌐1215

Compare predicted image at stage n – 1 to actual image at stage n - 1 ⌐1220

Update parameters of the model based on the comparison ⌐1225

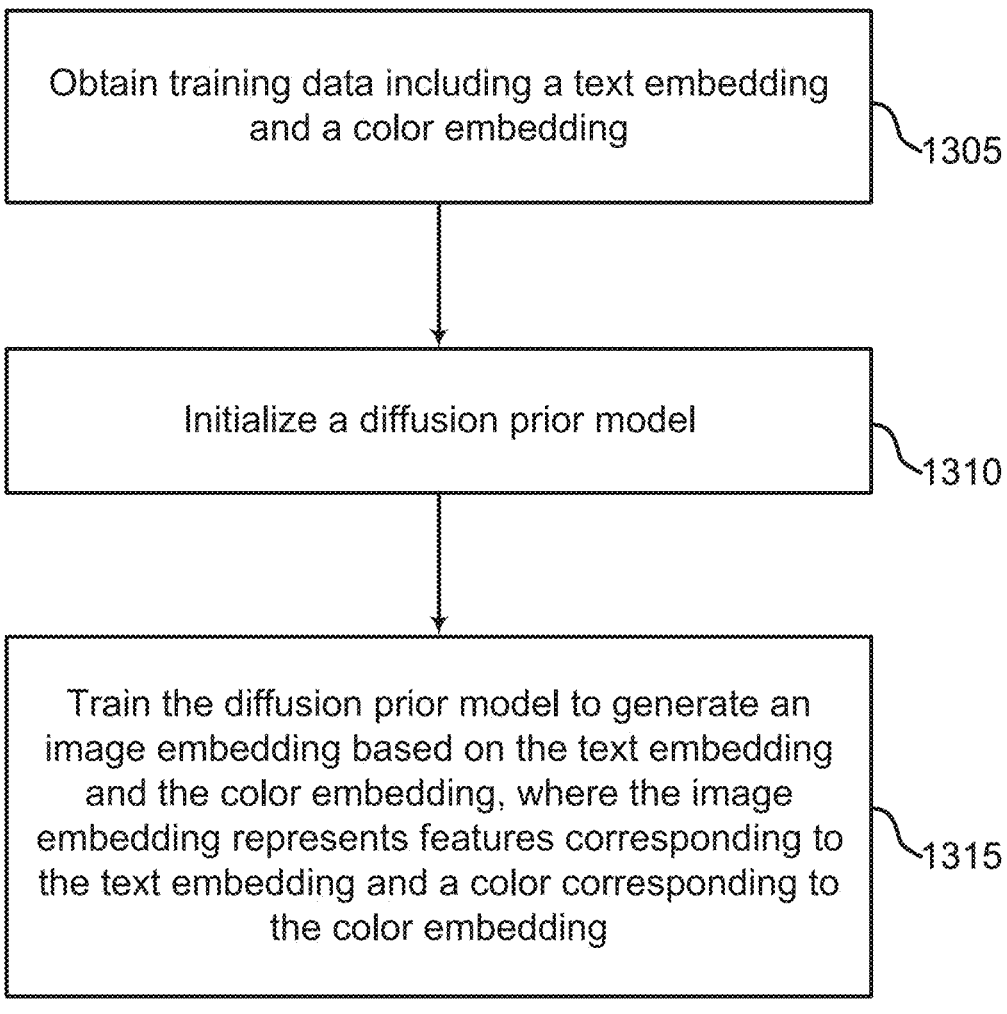

Obtain training data including a text embedding and a color embedding ⟍1305

Initialize a diffusion prior model ⟍1310

Train the diffusion prior model to generate an image embedding based on the text embedding and the color embedding, where the image embedding represents features corresponding to the text embedding and a color corresponding to the color embedding ⟍1315

COLOR CONDITIONED DIFFUSION PRIOR

BACKGROUND

The following relates generally to machine learning, and more specifically to machine learning for image generation. Digital image processing refers to the use of a computing device to edit a digital image using an algorithm or a processing network. In some cases, image processing software can be used for various image processing tasks, such as image editing, image restoration, image generation, etc. Some image processing systems may implement machine learning techniques, for example, to perform tasks using predictive models (e.g., without explicitly programming the system for each task), to perform tasks with more accuracy or in less time, to perform tasks using special-purpose hardware, etc.

Machine learning models are used in image generation such as generative deep learning models. However, conventional models involve high computational burden and memory usage and do not provide enough flexibility. Therefore, there is a need in the art for an improved image processing system that is optimized in terms of training efficiency and memory usage, and the improved system can provide image generation flexibility.

SUMMARY

The present disclosure describes systems and methods for image processing. Embodiments of the present disclosure include an image processing apparatus configured to generate an output image using an optimized image generation network. The image processing apparatus is configured to generate images using a combination of a diffusion prior model and a latent diffusion model. A text prompt is converted to a text embedding (e.g., a first condition) using a multi-modal encoder (e.g., CLIP model). A color encoder generates a color embedding (e.g., a second condition) based on a color prompt. The diffusion prior model of the image processing apparatus generates an image embedding based on the text embedding and the color embedding. The latent diffusion model receives the image embedding as input and generates one or more images based on the image embedding (e.g., image CLIP embedding).

A method, apparatus, and non-transitory computer readable medium for image processing are described. One or more embodiments of the method, apparatus, and non-transitory computer readable medium include encoding a text prompt to obtain a text embedding; encoding a color prompt to obtain a color embedding; generating an image embedding using a diffusion prior model based on the text embedding and the color embedding; and generating an image based on the image embedding using a latent diffusion model (LDM), wherein the image includes an element from the text prompt and a color from the color prompt.

A method, apparatus, and non-transitory computer readable medium for image processing are described. One or more embodiments of the method, apparatus, and non-transitory computer readable medium include obtaining training data including a text embedding and a color embedding; initializing a diffusion prior model; and training the diffusion prior model to generate an image embedding based on the text embedding and the color embedding, wherein the image embedding represents features corresponding to the text embedding and a color corresponding to the color embedding.

An apparatus and method for image processing are described. One or more embodiments of the apparatus and method include at least one processor; and at least one memory including instructions executable by the at least one processor to perform operations including: encoding, using a multi-modal encoder, a text prompt to obtain a text embedding; encoding, using a color encoder, a color prompt to obtain a color embedding; generating, using a diffusion prior model, an image embedding based on the text embedding and the color embedding; and generating, using a latent diffusion model, an image based on the image embedding, wherein the image includes an element from the text prompt and a color from the color prompt.

BRIEF DESCRIPTION OF THE DRAWINGS

FIGS. 13 and 14 show examples of methods for training a diffusion prior model according to aspects of the present disclosure.

DETAILED DESCRIPTION

Figure 1:
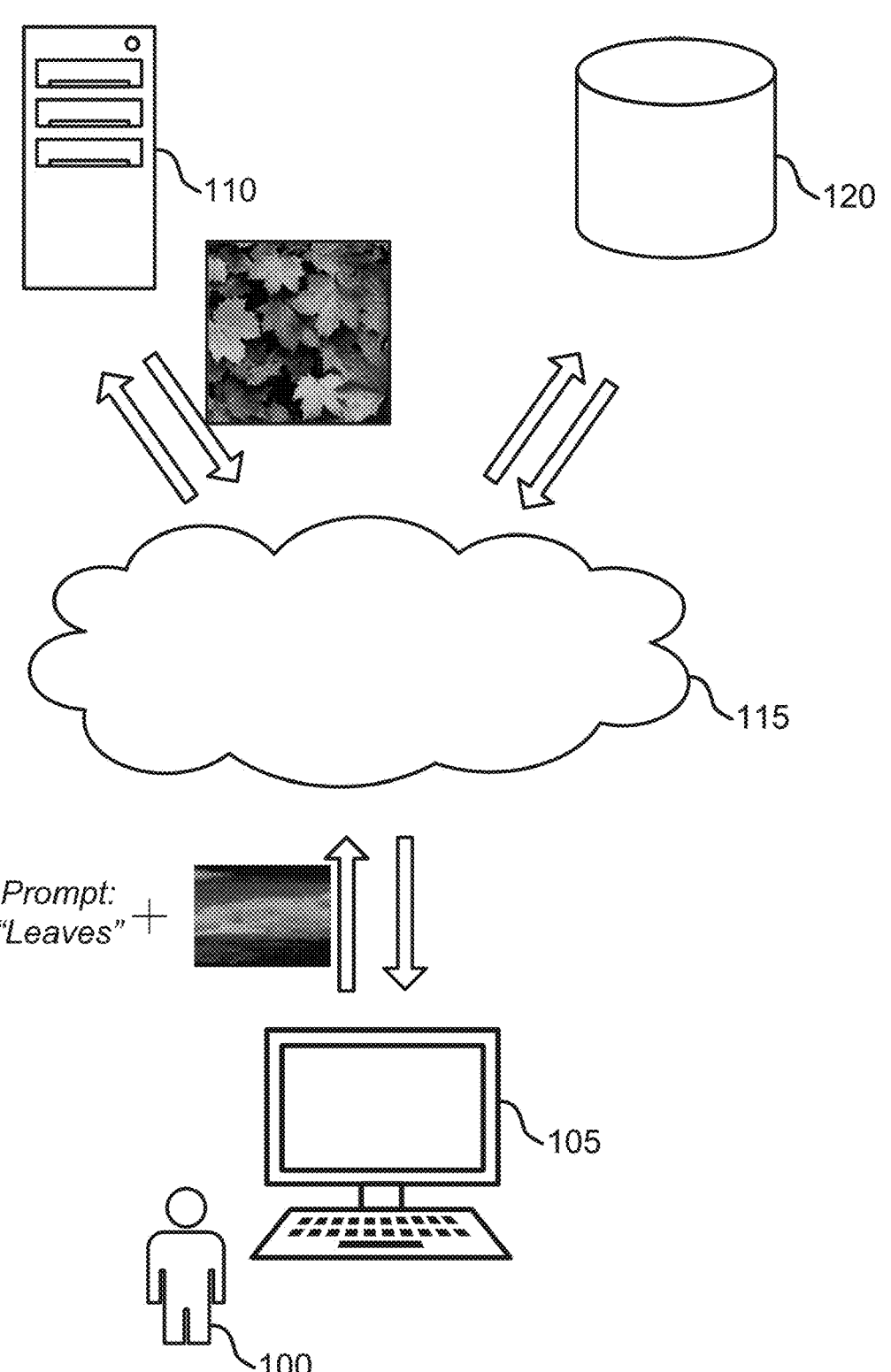
FIG. 1 shows an example of an image processing system according to aspects of the present disclosure.

The present disclosure describes systems and methods for image processing. Embodiments of the present disclosure include an image processing apparatus configured to generate an output image using an optimized image generation network. The image processing apparatus is configured to generate images using a combination of a diffusion prior model and a latent diffusion model. A text prompt is converted to a text embedding (e.g., a first condition) using a multi-modal encoder (e.g., CLIP model). A color encoder generates a color embedding (e.g., a second condition) based on a color prompt. The diffusion prior model of the image processing apparatus generates an image embedding based on the text embedding and the color embedding. The latent diffusion model receives the image embedding as input and generates one or more images based on the image embedding (e.g., image CLIP embedding).

Recently, image processing models are used in tasks such as image enhancement, restoration, completion, or compression. Image generative models can generate an output image based on text or an original image. Diffusion models are a class of generative neural networks that can be trained to generate new data with features similar to features found in training data. Diffusion models can be used in image generation tasks, such as converting text-based embedding to realistic images. However, diffusion models are limited to scenarios where the diffusion models rely on generating images in pixel space or rely on text information as a condition for image generation tasks (e.g., do not take color conditioning into account). Additionally, conventional models depend on large amount of training dataset and require costly computational resources to retrain or fine-tune the diffusion model.

Embodiments of the present disclosure include an image processing apparatus configured to generate an image based on a text prompt and a color prompt. The image processing apparatus is configured to generate images using a combination of a diffusion prior model and a latent diffusion model for image generation. The diffusion prior model maps a text embedding of the text prompt (e.g., text CLIP embedding using a multi-modal encoder such as CLIP model) to an image embedding (e.g., image CLIP embedding). The text embedding and the image embedding are in a multi-modal embedding space. The text embedding is in a first region of the multi-modal embedding space corresponding to text and the image embedding is in a second region of the multi-modal embedding space corresponding to images. CLIP (Contrastive Language-Image Pre-Training) model is a neural network trained on a variety of image-text pairs.

In some embodiments, the diffusion prior model receives a concatenated embedding (e.g., concatenated text and color embedding) and generates an image embedding based on the concatenated embedding. The latent diffusion model receives the image embedding as input and generates an image based on the image embedding. The image includes an element from the text prompt and a color from the color prompt (e.g., semantic information presented in the generated image is based on the text prompt and the color prompt).

In some embodiments, a multi-modal encoder receives a text prompt and generates a text embedding based on the text prompt. A color encoder receives a color prompt (e.g., a color image) and generates a color embedding based on the color prompt. A pretrained diffusion prior model receives the text embedding and the color embedding as inputs, and generates an image embedding based on the text embedding and the color embedding.

According to some embodiments, the diffusion prior model is trained with a color condition, and a smaller dataset is sufficient to train the diffusion prior model. Embodiments of the present disclosure enable faster training and improve image generation flexibility. Unlike conventional models that first generate an image and then apply color transfer to the image to obtain desired color-related features, embodiments of the present disclosure can generate an image based on an image embedding that includes information from the text prompt and the color prompt. Accordingly, the generated image from the latent diffusion model includes an element from the text prompt and a color from the color prompt.

In some embodiments, the diffusion prior model takes a text embedding and a color embedding as input. The diffusion prior model generates an image embedding based on the text embedding and the color embedding. During inference, the diffusion prior model passes one image embedding to the latent diffusion model to generate an image. In some examples, the diffusion prior model generates one hundred image embeddings. The one image embedding is selected out of the one hundred image embeddings using a similarity score computed between each of the generated image embeddings and the text embedding (e.g., multi-lingual CLIP similarity score). The selected image embedding is input to the latent diffusion model to generate an image. To generate the one hundred image embeddings, the diffusion prior model is configured to sample each image embedding using different noise values during the diffusion process such that the one hundred image embeddings go through the entire diffusion process.

At training, the diffusion prior model passes an image embedding to the latent diffusion model for image generation, i.e., the diffusion model uses the same image embedding context at all time steps to generate an image. At each time step of the training process of the diffusion prior model, the diffusion prior model uses noised CLIP image embedding along with a time step information to predict a less noised CLIP image embedding. This process continues for N timesteps until a refined and less noisy CLIP image embedding is generated. For example, this process is repeated one hundred times to predict one hundred different CLIP image embeddings, out of which one CLIP image embedding is selected based on cosine similarity between a predicted image embedding and a text embedding corresponding to a text prompt. The text embedding is used as guidance on how to remove the noise. As described herein, the terms "image CLIP embedding" and "CLIP image embedding" are used interchangeably. Similarly, the terms "text CLIP embedding" and "CLIP text embedding" may be used interchangeably.

Accordingly, by combining the diffusion prior model and the latent diffusion model, embodiments of the present disclosure enable better control and increase image generation quality on text-to-image generation. The latent diffusion model is trained to generate images from CLIP image embedding of the image, whereas the diffusion prior model is a flexible module (and cheaper to train) that can be used to map multiple modalities to an image embedding. The variety and diversity of the generated images are increased without the need to modify a text prompt on the user's end. For example, in text-to-image generation, the diffusion prior model is trained to map a CLIP text embedding of a text prompt to one or more CLIP image embeddings. This way, embodiments of the present disclosure can re-use the pretrained latent diffusion model without having to re-train the model so as to save memory and reduce computation burden.

Due to the unconventional method (e.g., generating an image based on text prompt and color prompt using a combination of a diffusion prior model and a latent diffusion model), one or more embodiments of the present disclosure enable faster training and mapping of the combination of color and text prompt to a closest image embedding, which is then used to generate the image. For example, text prompt "leaves" with color condition having mostly green color generates an image embedding which the image processing apparatus generates an image of a generic green leaf that might not be desirable. With a color condition (e.g., the second condition) with mostly orange and red colors, the image processing apparatus generates autumn/maple leaves which semantically suits the colors more appropriately.

Embodiments of the present disclosure can be used in the context of image generation applications. For example, an image processing apparatus based on the present disclosure receives a text prompt and a color prompt and generates one or more images based on the text prompt and the color prompt. An example application in the image generation processing context is provided with reference to FIGS. 8-10. Details regarding an example of the image processing system architecture are provided with reference to FIGS. 1-7. Details regarding the image generation process are provided with reference to FIG. 11. Examples of training processes are described with reference to FIGS. 12-14.

In some examples, embedding(s) refers to a low-dimensional space from which a high-dimensional vector can be converted. For example, an embedding or an embedding space captures the semantics of an input by grouping semantically similar inputs close together in the embedding space. In some cases, each individual word in a text prompt is represented as a real-valued vector in a lower-dimensional space such that the lower-dimensional space can capture inter-word semantics.

Network Architecture

In FIGS. 1-7 and 15, an apparatus and method for image processing are described. One or more aspects of the apparatus and method include at least one processor; and at least one memory including instructions executable by the at least one processor to perform operations including: encoding, using a multi-modal encoder, a text prompt to obtain a text embedding; encoding, using a color encoder, a color prompt to obtain a color embedding; generating, using a diffusion prior model, an image embedding based on the text embedding and the color embedding; and generating, using a latent diffusion model, an image based on the image embedding, wherein the image includes an element from the text prompt and a color from the color prompt.

In some aspects, the color encoder comprises a color histogram extractor configured to extract a color histogram from the color prompt. In some aspects, the diffusion prior model comprises a transformer architecture. In some aspects, the LDM comprises a U-Net architecture. In some aspects, the LDM comprises an image decoder. Some examples of the apparatus and method further include a training component configured to train the diffusion prior model.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 2.

Referring to an example shown in FIG. 1, user 100 provides a text prompt and a color prompt (e.g., a color image) to image processing apparatus 110 via user device 105 and cloud 115. The text prompt may include a natural language statement, e.g., "leaves". The color prompt is a color image depicting a variety of colors or color-related features. For example, the color image includes different shades of orange color. In some cases, the color image includes one or more colors (e.g., yellow, orange, black). Image processing apparatus 110 then generates an image, via a combination of a diffusion prior model and a latent diffusion model, based on the text prompt and the color prompt.

Image processing apparatus 110 displays the generated image to user 100, e.g., via cloud 115 and user device 105. The generated image includes one or more elements from the text prompt and one or more elements (e.g., color elements) from the color prompt. For example, an element from the text prompt may include object/class, metadata, etc. The generated image includes yellow/orange maple leaves. By conditioning image generation tasks jointly on the text prompt ("leaves") and color prompt (a color image having yellow, orange, and/or red colors), image processing apparatus 110 generates autumn/maple leaves that semantically suit the colors and text more appropriately. This way, a more desirable image outcome is transmitted and presented to user 100.

According to some embodiments of the present disclosure, image processing apparatus 110 includes a diffusion prior model and a latent diffusion model. At training, a training component trains the diffusion prior model based on a color condition, where a color embedding is concatenated with a text embedding and the concatenated embedding is used to predict an image embedding (e.g., image CLIP embedding). The image embedding enables a shared attention weight between the text embedding from the text prompt and the color embedding from the color prompt. The latent diffusion model of image processing apparatus 110 generates the image (e.g., image of autumn/maple leaves) based on the image embedding.

User device 105 may be a personal computer, laptop computer, mainframe computer, palmtop computer, personal assistant, mobile device, or any other suitable processing apparatus. In some examples, user device 105 includes software that incorporates an image processing application. In some examples, the image processing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device 105 and rendered locally by a browser.

According to some embodiments of the present disclosure, image processing apparatus 110 encodes, using a multi-modal encoder, the text prompt to obtain a text embedding. Image processing apparatus 110 encodes, using a color encoder, a color prompt to obtain a color embedding. Image processing apparatus 110 generates an image embedding based on the text embedding and the color embedding using a diffusion prior model. Image processing apparatus 110 generates an image based on the image embedding using a latent diffusion model. Further detail regarding the diffusion prior model and the latent diffusion model is provided with reference to FIGS. 2 and 5-7.

Figure 2:
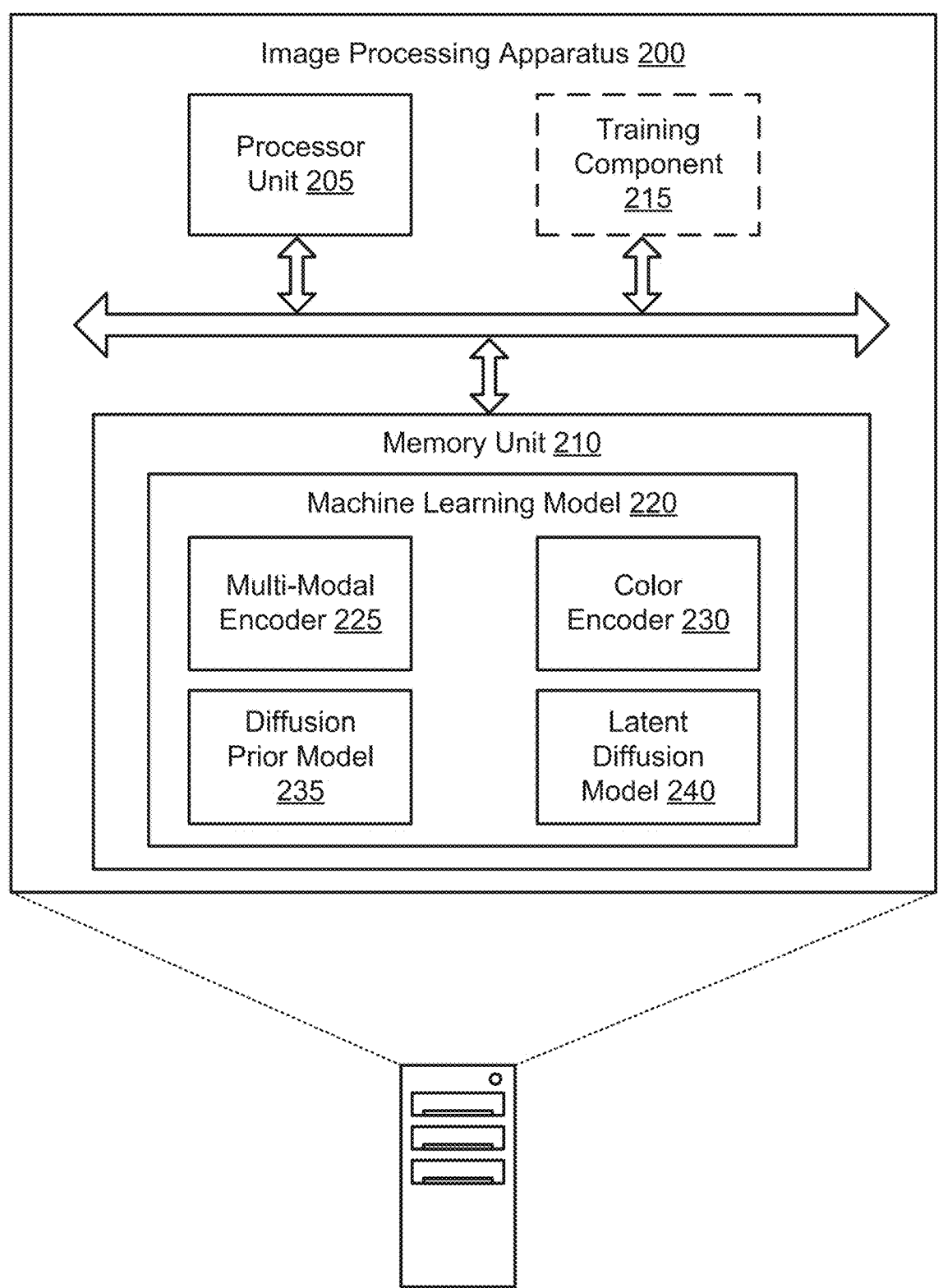
FIG. 2 shows an example of an image processing apparatus according to aspects of the present disclosure.

Image processing apparatus 110 includes a computer implemented network comprising a machine learning model (e.g., machine learning model 220 in FIG. 2). The machine learning model includes a multi-modal encoder, a color encoder, a diffusion prior model, and a latent diffusion model. Image processing apparatus 110 also includes a processor unit, a memory unit, and a training component. Additionally, image processing apparatus 110 communicates with database 120 via cloud 115. In some cases, the architecture of the image processing network is also referred to as a network or a network model. Further detail regarding the architecture of image processing apparatus 110 is provided with reference to FIG. 2. Further detail regarding the application and operation of image processing apparatus 110 is provided with reference to FIGS. 8-11.

In some cases, image processing apparatus 110 is implemented on a server. A server provides one or more functions to users linked by way of one or more of the various networks. In some cases, the server includes a single micro-processor board, which includes a microprocessor respon-sible for controlling all aspects of the server. In some cases, a server uses one or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for display-ing web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by user 100. The term "cloud" is sometimes used to describe data centers available to many users (e.g., user 100) over the Internet. Some large cloud networks have functions distrib-uted over multiple locations from central servers. A server is designated an edge server if the server has a direct or close connection to a user (e.g., user 100). In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some embodiments, cloud 115 enables communication between user device 105, image processing apparatus 110, and data-base 120.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and process-ing in database 120. In some cases, user 100 interacts with database controller. In other cases, database controller may operate automatically without user interaction. According to some embodiments, database 120 is external to image pro-cessing apparatus 110 and communicates with image pro-cessing apparatus 110 via cloud 115. According to some embodiments, database 120 is included in image processing apparatus 110.

FIG. 2 shows an example of an image processing appa-ratus according to aspects of the present disclosure. The example shown includes image processing apparatus 200, processor unit 205, memory unit 210, training component 215, and machine learning model 220. In an embodiment, machine learning model 220 includes multi-modal encoder 225, color encoder 230, diffusion prior model 235, and latent diffusion model 240. Image processing apparatus 200 is an example of, or includes aspects of, the corresponding ele-ment described with reference to FIG. 1.

Processor unit 205 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware compo-nent, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special-purpose components for modem processing, baseband processing, digital signal processing, or transmission processing. pro-cessor unit 205 is an example of, or includes aspects of, the processor described with reference to FIG. 15.

In an embodiment, memory unit 210 includes or stores trainable parameters of machine learning model 220. Memory unit 210 includes instructions executable by a processor (processor unit 205) to perform certain functions of machine learning model 220.

Examples of memory unit 210 include random access memory (RAM), read-only memory (ROM), or a hard disk. Examples of memory unit 210 include solid-state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state. Memory unit 210 is an example of, or includes aspects of, the memory subsystem described with reference to FIG. 15.

According to some embodiments of the present disclo-sure, image processing apparatus 200 includes a computer-implemented artificial neural network (ANN) to generate classification data for a set of samples. An ANN is a hardware or a software component that includes a number of connected nodes (i.e., artificial neurons), which loosely correspond to the neurons in a human brain. Each connec-tion, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge are associated with one or more node weights that determine how the signal is pro-cessed and transmitted.

According to some embodiments, image processing appa-ratus 200 includes a computer-implemented convolutional neural network (CNN). CNN is a class of neural networks that is commonly used in computer vision or image classi-fication systems. In some cases, a CNN may enable pro-cessing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that the filters activate when the filters detect a particular feature within the input.

According to some embodiments, training component 215 obtains training data including a text embedding and a color embedding. In some examples, training component 215 initializes a diffusion prior model 235. Training component 215 trains diffusion prior model 235 to generate an image embedding based on the text embedding and the color embedding, where the image embedding represents features corresponding to the text embedding and a color corresponding to the color embedding.

In some examples, training component 215 trains latent diffusion model 240 to generate an image based on the image embedding. In some examples, training component 215 computes a loss function by comparing the predicted image embedding to a ground-truth image embedding, where diffusion prior model 235 is trained based on the loss function.

According to some embodiments, machine learning model 220 identifies a candidate image embedding for a candidate image. In some examples, machine learning model 220 compares the image embedding to the candidate image embedding. Machine learning model 220 provides the candidate image as a search result based on the comparison. Machine learning model 220 is an example of, or includes aspects of, the corresponding element described with reference to FIG. 5.

According to some embodiments, multi-modal encoder 225 encodes a text prompt to obtain a text embedding. In some examples, the text embedding and the image embedding are in a multi-modal embedding space. The text embedding is in a first region of the multi-modal embedding space corresponding to text and the image embedding is in a second region of the multi-modal embedding space corresponding to images.

According to some embodiments, multi-modal encoder 225 encodes a text prompt describing a ground-truth image to obtain the text embedding. Multi-modal encoder 225 is an example of, or includes aspects of, the corresponding element described with reference to FIGS. 5-7.

According to some embodiments, color encoder 230 encodes a color prompt to obtain a color embedding. In some examples, the color prompt includes a color image. In some examples, the color embedding includes a color histogram. According to some embodiments, color encoder 230 encodes the ground-truth image to obtain the color embedding.

In some examples, color encoder 230 includes a color histogram extractor configured to extract a color histogram from the color prompt. Color encoder 230 is an example of, or includes aspects of, the corresponding element described with reference to FIG. 5.

According to some embodiments, diffusion prior model 235 generates an image embedding based on the text embedding and the color embedding. In some examples, diffusion prior model 235 generates a set of image embeddings based on the text embedding and the color embedding, where the image embedding is selected from the set of image embeddings. In an embodiment, diffusion prior model 235 generates a predicted image embedding.

In some examples, diffusion prior model 235 includes a transformer architecture. Diffusion prior model 235 is an example of, or includes aspects of, the corresponding element described with reference to FIGS. 5-7.

According to some embodiments, latent diffusion model 240 generates an image based on the image embedding, where the image includes an element from the text prompt and a color from the color prompt. In some examples, latent diffusion model 240 generates a set of images based on the set of image embeddings, respectively, where each of the set of images includes the element from the text prompt and the color from the color prompt. In some examples, latent diffusion model 240 generates a set of images based on the image embedding, where each of the set of images includes the element from the text prompt and the color from the color prompt. In some examples, latent diffusion model 240 generates a modified image embedding, where the image is generated based on the modified image embedding.

According to some embodiments, latent diffusion model 240 generates an image based on the image embedding wherein the image includes an element from the text prompt and a color from the color prompt. In some examples, latent diffusion model 240 includes a U-Net architecture. In some examples, latent diffusion model 240 includes an image decoder. Latent diffusion model 240 is an example of, or includes aspects of, the corresponding element described with reference to FIGS. 5 and 7.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
FIG. 3 shows an example of a latent diffusion model according to aspects of the present disclosure.

FIG. 3 shows an example of a latent diffusion model according to aspects of the present disclosure. The example shown includes guided latent diffusion model 300, original image 305, pixel space 310, image encoder 315, original image features 320, latent space 325, forward diffusion process 330, noisy features 335, reverse diffusion process 340, denoised image features 345, image decoder 350, output image 355, text prompt 360, text encoder 365, guidance features 370, and guidance space 375. Text prompt 360 is an example of, or includes aspects of, the corresponding element described with reference to FIGS. 5, 9, and 10.

Latent diffusion models work by iteratively adding noise to the data during a forward process and then learning to recover the data by denoising the data during a reverse process. For example, during training, guided latent diffusion model 300 may take an original image 305 in a pixel space 310 as input and apply image encoder 315 to convert original image 305 into original image features 320 in a latent space 325. Then, a forward diffusion process 330 gradually adds noise to the original image features 320 to obtain noisy features 335 (also in latent space 325) at various noise levels.

Next, a reverse diffusion process 340 (e.g., a U-Net ANN) gradually removes the noise from the noisy features 335 at the various noise levels to obtain denoised image features 345 in latent space 325. In some examples, the denoised image features 345 are compared to the original image features 320 at each of the various noise levels, and parameters of the reverse diffusion process 340 of the diffusion model are updated based on the comparison. Finally, an image decoder 350 decodes the denoised image features 345 to obtain an output image 355 in pixel space 310. In some cases, an output image 355 is created at each of the various noise levels. The output image 355 can be compared to the original image 305 to train the reverse diffusion process 340.

In some cases, image encoder 315 and image decoder 350 are pre-trained prior to training the reverse diffusion process 340. In some examples, image encoder 315 and image decoder 350 are trained jointly, or the image encoder 315 and image decoder 350 and fine-tuned jointly with the reverse diffusion process 340.

The reverse diffusion process 340 can also be guided based on a text prompt 360, or another guidance prompt, such as an image, a layout, a segmentation map, etc. The text prompt 360 can be encoded using a text encoder 365 (e.g., a multi-modal encoder) to obtain guidance features 370 in guidance space 375. The guidance features 370 can be combined with the noisy features 335 at one or more layers of the reverse diffusion process 340 to ensure that the output image 355 includes content described by the text prompt 360. For example, guidance features 370 can be combined with the noisy features 335 using a cross-attention block within the reverse diffusion process 340 in latent space 325.

Figure 4:
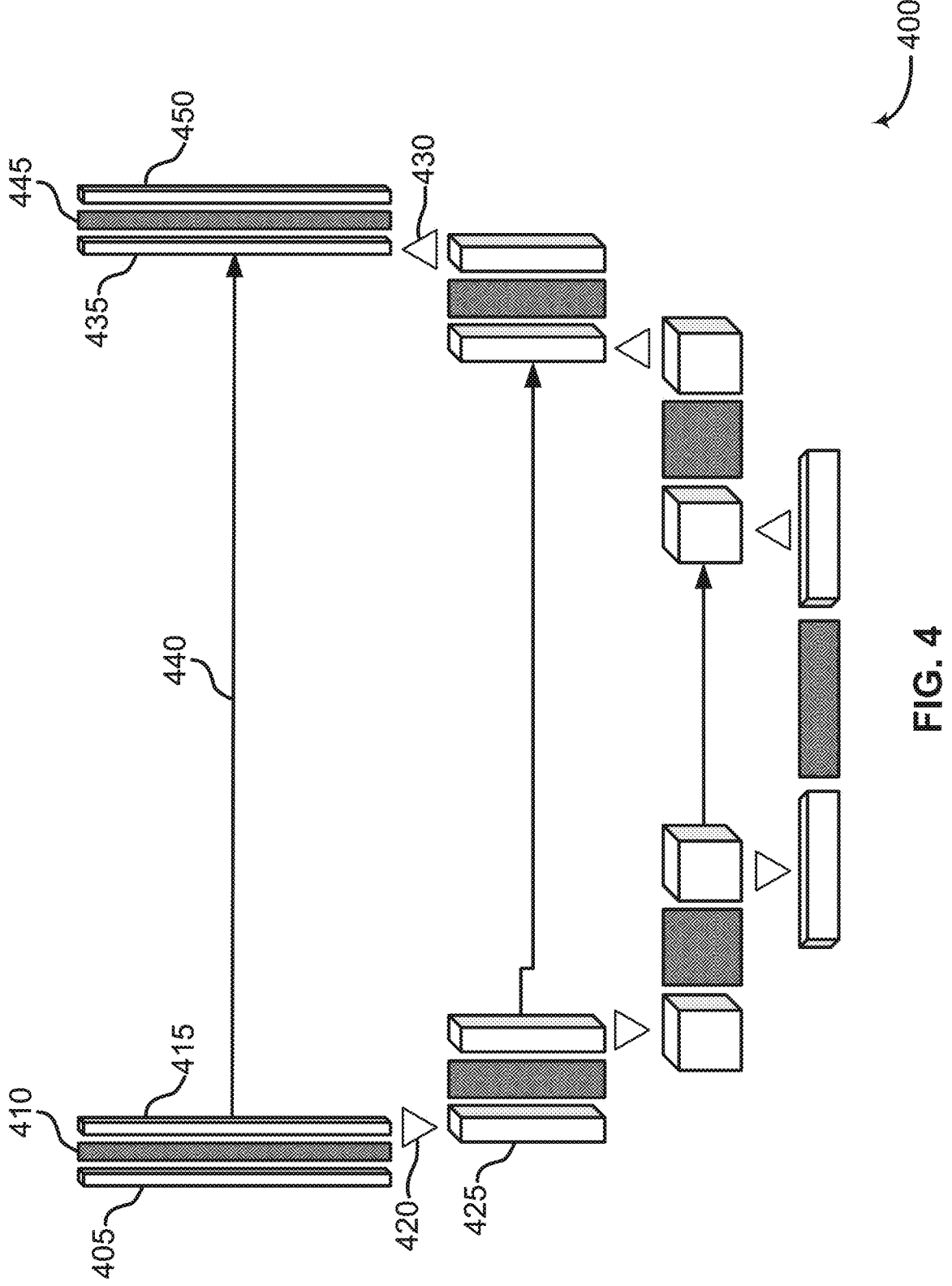
FIG. 4 shows an example of a U-Net architecture according to aspects of the present disclosure.

FIG. 4 shows an example of a U-Net 400 architecture according to aspects of the present disclosure. The example shown includes U-Net 400, input features 405, initial neural network layer 410, intermediate features 415, down-sampling layer 420, down-sampled features 425, up-sampling process 430, up-sampled features 435, skip connection 440, final neural network layer 445, and output features 450.

In some examples, diffusion models are based on a neural network architecture known as a U-Net 400. The U-Net 400 takes input features 405 having an initial resolution and an initial number of channels, and processes the input features 405 using an initial neural network layer 410 (e.g., a convolutional network layer) to produce intermediate features 415. The intermediate features 415 are then down-sampled using a down-sampling layer 420 such that down-sampled features 425 features have a resolution less than the initial resolution and a number of channels greater than the initial number of channels.

This process is repeated multiple times, and then the process is reversed. For example, the down-sampled features 425 are up-sampled using up-sampling process 430 to obtain up-sampled features 435. The up-sampled features 435 can be combined with intermediate features 415 having a same resolution and number of channels via a skip connection 440. These inputs are processed using a final neural network layer 445 to produce output features 450. In some cases, the output features 450 have the same resolution as the initial resolution and the same number of channels as the initial number of channels.

In some cases, U-Net 400 takes additional input features to produce conditionally generated output. For example, the additional input features could include a vector representation of an input prompt. The additional input features can be combined with the intermediate features 415 within the neural network at one or more layers. For example, a cross-attention module can be used to combine the additional input features and the intermediate features 415.

The U-Net 400 depicted in FIG. 4 is an example of, or includes aspects of, the architecture used within the reverse diffusion process described with reference to FIG. 3. U-Net 400 is an example of, or includes aspects of, the corresponding element described with reference to FIG. 7.

Figure 5:
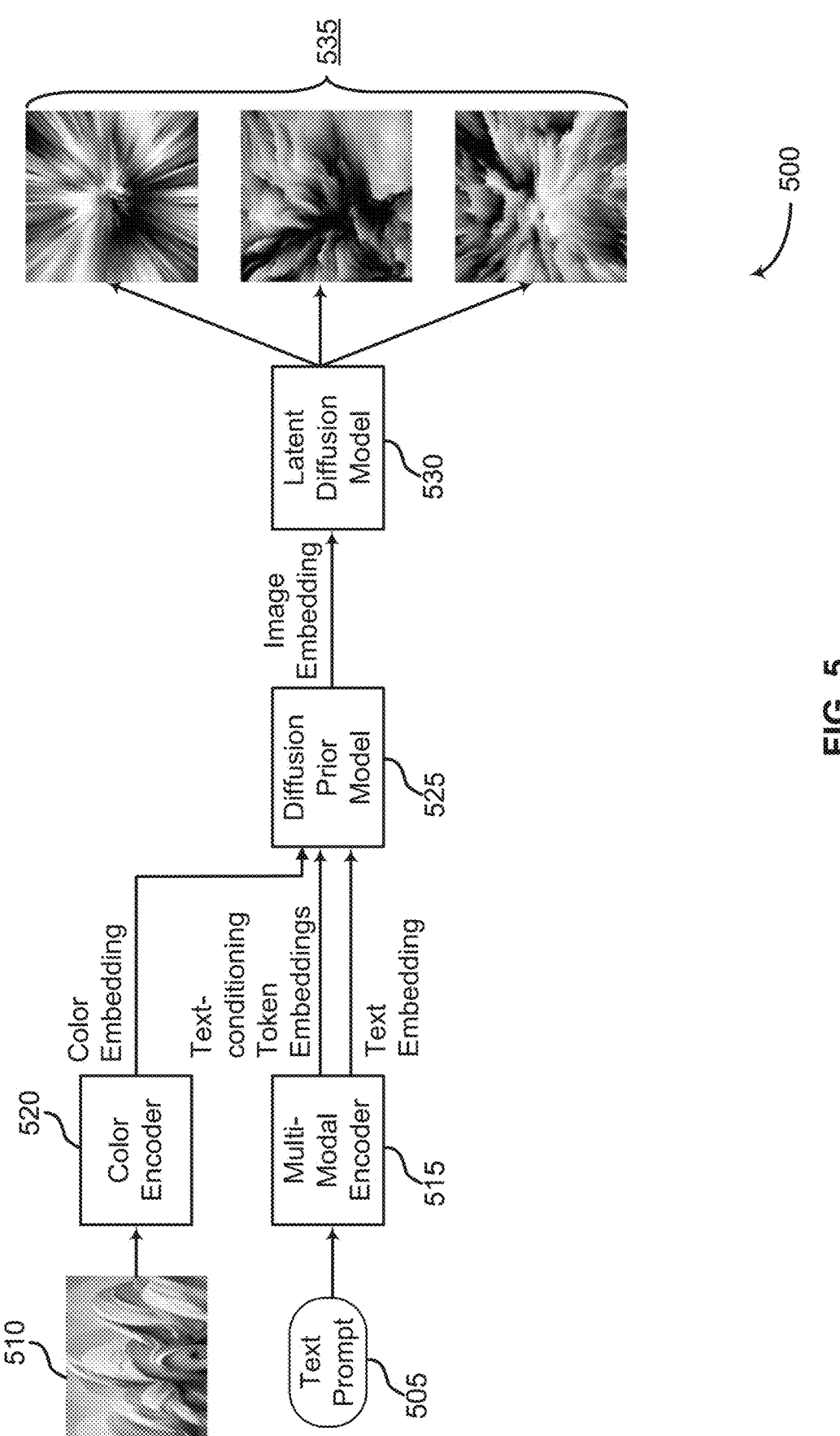
FIG. 5 shows an example of a machine learning model according to aspects of the present disclosure.

FIG. 5 shows an example of a machine learning model according to aspects of the present disclosure. The example shown includes machine learning model 500, text prompt 505, color prompt 510, multi-modal encoder 515, color encoder 520, diffusion prior model 525, latent diffusion model 530, and generated image(s) 535. Machine learning model 500 is an example of, or includes aspects of, the corresponding element described with reference to FIG. 2.

Referring to FIG. 5, multi-modal encoder 515 receives text prompt 505 as input and generates a text embedding based on text prompt 505. In some cases, multi-modal encoder 515 may generate text-conditioning token embeddings. Text-conditioning token embeddings may also be referred to as token embeddings for brevity. For example, machine learning model 500 converts text prompt 505 into tokens (e.g., token embeddings) and the first 77 tokens are used as text input. In some embodiments, a learned tokenizer converts text prompt 505 into tokens. For example, during training and inference for a given sample, the machine learning model 500 is configured to concatenate the color embedding (batch_size, 1, 768) with the text conditional token embeddings (batch_size, max_text_len, 768), which makes it (batch_size, max_text_len+1, 768). Contrastive Language-Image Pre-training (CLIP) model generates a text embedding (batch size, 1, 768). The learned tokenizer generates token embeddings (batch size, max_text_length, 768) (e.g., 77, 768). Multi-modal encoder 515 is an example of, or includes aspects of, the corresponding element described with reference to FIGS. 2, 6, and 7.

In some embodiments, machine learning model 500 includes a CLIP model that converts images and the corresponding text in a same embedding space. For example, multi-modal encoder 515 is a CLIP model. Alternatively, embodiments of the present disclosure may use or include a multi-modal model other than CLIP.

Color encoder 520 receives color prompt 510 as input and generates a color embedding based on color prompt 510. In an embodiment, color encoder 520 includes a color histogram extractor. To generate the color embedding(s) (also referred to as color histograms), machine learning model 500 converts an image (e.g., color prompt 510) in red, green, and blue (RGB) color space to a LAB color space. For example, if two color vectors in the RGB space are close to each other (using L2 distance), the color vectors might not necessarily be perceptually close with respect to human color vision. Instead, LAB space is configured to be perceptually uniform with respect to human color vision, which refers to the same amount of numerical change in these values corresponds to about the same amount of visually perceived change. Therefore, machine learning model 500 is configured to use 3D histograms in LAB color space. Color encoder 520 is an example of, or includes aspects of, the corresponding element described with reference to FIG. 2.

For example, colors can be represented in a multi-dimensional color space, such as in a RGB color space (e.g., colors are represented by red, green, and blue components). Machine learning model 500 generates a 3D color histogram of an image in a LAB color space, sometimes referred to as a CIELAB color space. A LAB color space may include a first dimension that represents luminance (or lightness), a second dimension that represents green-red, and a third dimension that represents blue-yellow. A color in LAB color space can thus be denoted as a three-tuple including a value of L for the lightness, and A and B values for the green-red and blue-yellow color components, respectively. A LAB color space is consistent with human perception, in that an amount of change in one or more of the L, A, or B values generally corresponds to about the same amount of visually perceived change.

In one example, machine learning model 500 determines a first color histogram and a second color histogram as respective 3D histograms with different numbers of bins from one another in a LAB color space. The first color histogram can include different numbers of bins in each of the dimensions of the LAB color space, such as nine bins in the L dimension, seven bins in the A dimension, and eight bins in the B dimension, and the second color histogram can include a same number of bins in each of the dimensions of the LAB color space that is different than the numbers of bins of the first color histogram, such as ten bins in each of the L dimension, the A dimension, and the B dimension.

For example, machine learning model 500 uses a histogram size of [10,8,9] which generates a color embedding having a dimension size 720. In some cases, the image embeddings and text CLIP embeddings have a dimension size of 768. To make the color embedding and text CLIP embedding have the same embedding dimension, machine learning model 500 fills or pads 48 0's to the color embedding such that the color embedding is modified to have a dimension size of 768. Then, the square root of each number in the feature vectors is taken to obtain the color embedding. In some cases, taking the square root can penalize the dominant color and give more weight to the other colors in the image.

Diffusion prior model 525 receives color embedding (generated from color encoder 520), token embeddings, and text embedding from multi-modal encoder 515 as input. Diffusion prior model 525 generates an image embedding based on the text embedding, token embeddings, and the color embedding. For example, diffusion prior model 525 receives a text CLIP embedding (batch size, 1, 768), text conditional token embeddings (batch size, max_text_length, 768), and a color embedding (batch size, 1, 768). These embeddings are concatenated. Machine learning model 500 concatenates color embedding with text encoding (including text embedding and the text conditional token embeddings), accordingly attention weights are shared. The concatenation of the color embedding with the text token embeddings makes the color embedding part of the text token encodings as an additional proxy text encoding. Therefore, in the next part of the diffusion prior setup, when the cross attention is calculated between the text encodings, the color embedding also shares the attention weights. Therefore, the generation process semantically changes with the color condition as the text and color inputs are now co-related. To have more controllability over color conditioning, some embodiments perform a separate classifier free guidance on it separately by dropping the color embeddings a certain number of times as compared to text and image conditionings.

As used herein, attention weights refer to important elements of input data during the computation of an attention mechanism. Attention weight is used to determine the relevance of each word in text prompt 505. The attention mechanism assigns weights to each word in text prompt 505, where higher weights may indicate higher relevance or importance, and lower weights may indicate lower relevance.

In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values. In the context of an attention network, the key and value are typically vectors or matrices that are used to represent the input data. The key is used to determine which parts of the input the attention mechanism should focus on, while the value is used to represent the actual data being processed.

Diffusion prior model 525 maps the text CLIP embedding to a corresponding image CLIP embedding. In some cases, a text CLIP embedding may correspond to a set of image CLIP embeddings. Diffusion prior model 525 ranks the set of image CLIP embeddings and selects an image CLIP embedding that is closest to the text CLIP embedding based on a metric (e.g., a similarity score). Diffusion prior model 525 is pre-trained and may be retrained. Diffusion prior model 525 is an example of, or includes aspects of, the corresponding element described with reference to FIGS. 2, 6, and 7.

Latent diffusion model 530 may receive the image embedding and output generated image(s) 535. For example, generated image(s) 535 may include one or more elements from text prompt 505 and more or more colors from color prompt 510. For example, an element from the text prompt may include object/class, metadata, description, context, relevance, etc. In some embodiments, latent diffusion model 530 may be pretrained. Latent diffusion model 530 is an example of, or includes aspects of, the corresponding element described with reference to FIGS. 2 and 7.

Text prompt 505 is an example of, or includes aspects of, the corresponding element described with reference to FIGS. 3, 9, and 10. Color prompt 510 is an example of, or includes aspects of, the corresponding element described with reference to FIGS. 9 and 10. Generated image(s) 535 is an example of, or includes aspects of, the corresponding element described with reference to FIG. 9.

Figure 6:
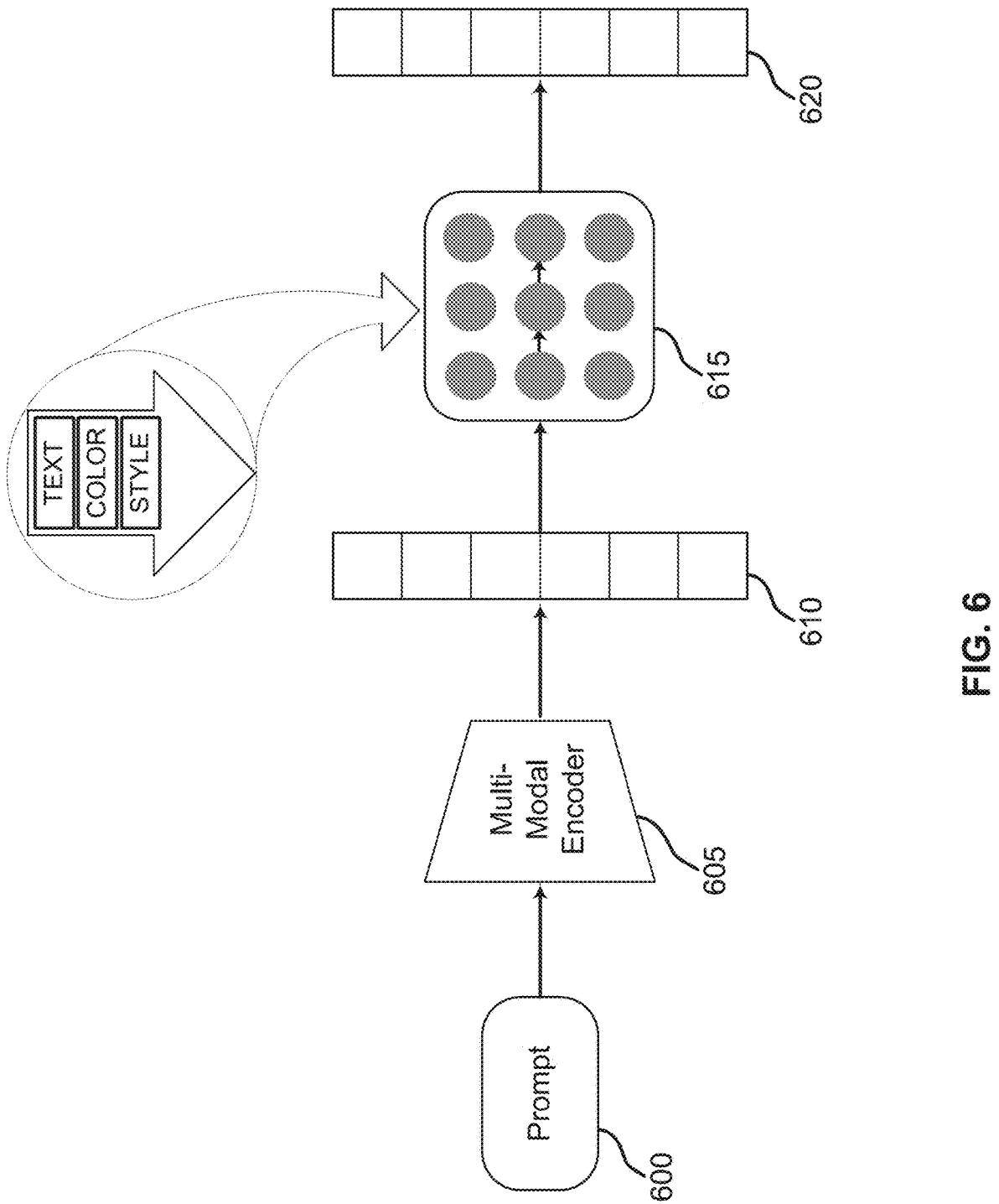
FIG. 6 shows an example of a diffusion prior model according to aspects of the present disclosure.

FIG. 6 shows an example of a diffusion prior model according to aspects of the present disclosure. The example shown includes prompt 600, multi-modal encoder 605, text embedding 610, diffusion prior model 615, and image embedding 620.

In some embodiments, diffusion prior model 615 includes a diffusion-based mapping function that learns a target embedding when conditioned on a source embedding. For example, diffusion prior model 615 is conditioned on text embedding 610 to predict a corresponding image embedding 620. In some cases, the input conditioning is not limited to text conditioning, and may be replaced or augmented by other types of embeddings. For example, other types of embeddings include but are not limited to color embeddings of an image prompt, style embeddings of the image, tag embeddings, and sketch embeddings. These embeddings, with or without text embedding 610, are input to diffusion prior model 615 to predict a corresponding image embedding 620.

In one embodiment, multi-modal encoder 605 receives prompt 600 and generates text embedding 610. In some cases, other embeddings such as color embedding, style embedding, tag embedding, and/or sketch embedding are input into diffusion prior model 615 together with text embedding 610. Diffusion prior model 615 received text embedding 610 and one or more additional embeddings (of different modality or type) to generate image embedding 620.

In an embodiment, diffusion prior model 615 generates a set of image embeddings based on text embedding 610. Diffusion prior model 615 scores and ranks the set of image embeddings by comparing each image embedding of image embeddings 620 to text embedding 610. In an embodiment, diffusion prior model 615 calculates a similarity score between the text embedding 610 and each image embedding of image embeddings 620 and selects one or more image embeddings 620 with the highest similarity score (e.g., select top k image embeddings that correspond to the top k highest similarity scores). A high similarity score shows that image embedding 620 is similar to text embedding 610 in a common embedding space. Text embedding 610 and image embedding 620 are in a multi-modal embedding space. For example, diffusion prior model 615 ranks the set of image CLIP embeddings and selects an image CLIP embedding that is closest to the text CLIP embedding.

In an embodiment, diffusion prior model 615 receives different types of input prompts. Diffusion prior model 615 receives a text prompt, where the text prompt includes a word, a short phrase, or a long sentence. Diffusion prior model 615 also receives a color prompt, where the color prompt includes a color palette or a color image. Multi-modal encoder 605 encodes a text prompt to obtain a text embedding (e.g., text embedding 610). A color encoder encodes a color prompt to obtain a color embedding. Diffusion prior model 615 generates an image embedding 620 based on the text embedding and the color embedding.

Multi-modal encoder 605 is an example of, or includes aspects of, the corresponding element described with reference to FIGS. 2, 5, and 7. Diffusion prior model 615 is an example of, or includes aspects of, the corresponding element described with reference to FIGS. 2, 5, and 7.

Figure 7:
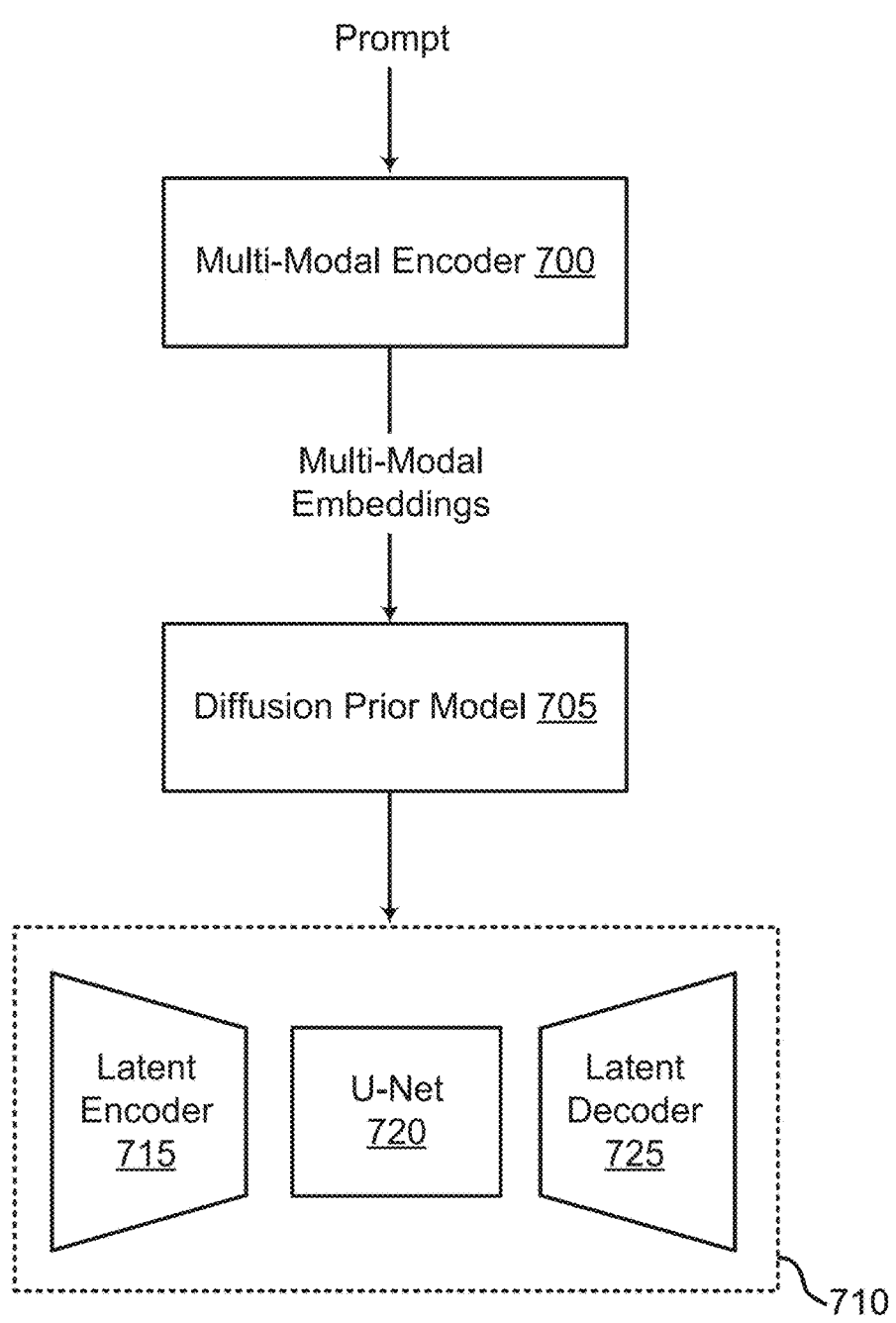
FIG. 7 shows an example of a machine learning model according to aspects of the present disclosure.

FIG. 7 shows an example of a machine learning model according to aspects of the present disclosure. The example shown includes multi-modal encoder 700, diffusion prior model 705, and latent diffusion model 710. In an embodiment, latent diffusion model 710 includes latent encoder 715, U-Net 720, and latent decoder 725. Latent diffusion model 710 is an example of, or includes aspects of, the corresponding element described with reference to FIGS. 2 and 5. U-Net 720 is an example of, or includes aspects of, the corresponding element described with reference to FIG. 4.

Referring to FIG. 7, multi-modal encoder 700 receives a text prompt and a color prompt as input. Multi-modal encoder 700 generates a multi-modal embedding corresponding to the text prompt and the color prompt, respectively. In an embodiment, multi-modal encoder 700 receives a text prompt and generates a text embedding based on the text prompt. Multi-modal encoder 700 receives a color prompt (e.g., a color image) and generates a color embedding based on the color prompt.

In an embodiment, a color encoder generates the color embedding based on the color prompt. The text embedding and the color embedding are input to diffusion prior model 705, where diffusion prior model 705 generates one or more image embeddings. The image embeddings are input to latent diffusion model 710. Latent diffusion model 710 generates images having different aspect ratios, where each of the generated images includes an element from the text prompt and a color from the color prompt.

Multi-modal encoder 700 is an example of, or includes aspects of, the corresponding element described with reference to FIGS. 2, 5, and 6. Diffusion prior model 705 is an example of, or includes aspects of, the corresponding element described with reference to FIGS. 2, 5, and 6.

Image Generation

In FIGS. 8-11, a method, apparatus, and non-transitory computer readable medium for image processing are described. One or more aspects of the method, apparatus, and non-transitory computer readable medium include encoding a text prompt to obtain a text embedding; encoding a color prompt to obtain a color embedding; generating an image embedding using a diffusion prior model based on the text embedding and the color embedding; and generating an image based on the image embedding using a latent diffusion model (LDM), wherein the image includes an element from the text prompt and a color from the color prompt.

In some aspects, the text embedding and the image embedding are in a multi-modal embedding space. In some aspects, the text embedding is in a first region of the multi-modal embedding space corresponding to text and the image embedding is in a second region of the multi-modal embedding space corresponding to images. In some aspects, the color prompt comprises a color image. In some aspects, the color embedding comprises a color histogram.

Some examples of the method, apparatus, and non-transitory computer readable medium further include identifying a candidate image embedding for a candidate image. Some examples further include comparing the image embedding to the candidate image embedding. Some examples further include providing the candidate image as a search result based on the comparison.

Some examples of the method, apparatus, and non-transitory computer readable medium further include generating a plurality of image embeddings based on the text embedding and the color embedding, wherein the image embedding is selected from the plurality of image embeddings. Some examples further include generating a plurality of images based on the plurality of image embeddings, respectively, wherein each of the plurality of images includes the element from the text prompt and the color from the color prompt.

Some examples of the method, apparatus, and non-transitory computer readable medium further include generating a plurality of images based on the image embedding, wherein each of the plurality of images includes the element from the text prompt and the color from the color prompt. Some examples of the method, apparatus, and non-transitory computer readable medium further include generating a modified image embedding using the LDM, wherein the image is generated based on the modified image embedding.

Figure 8:
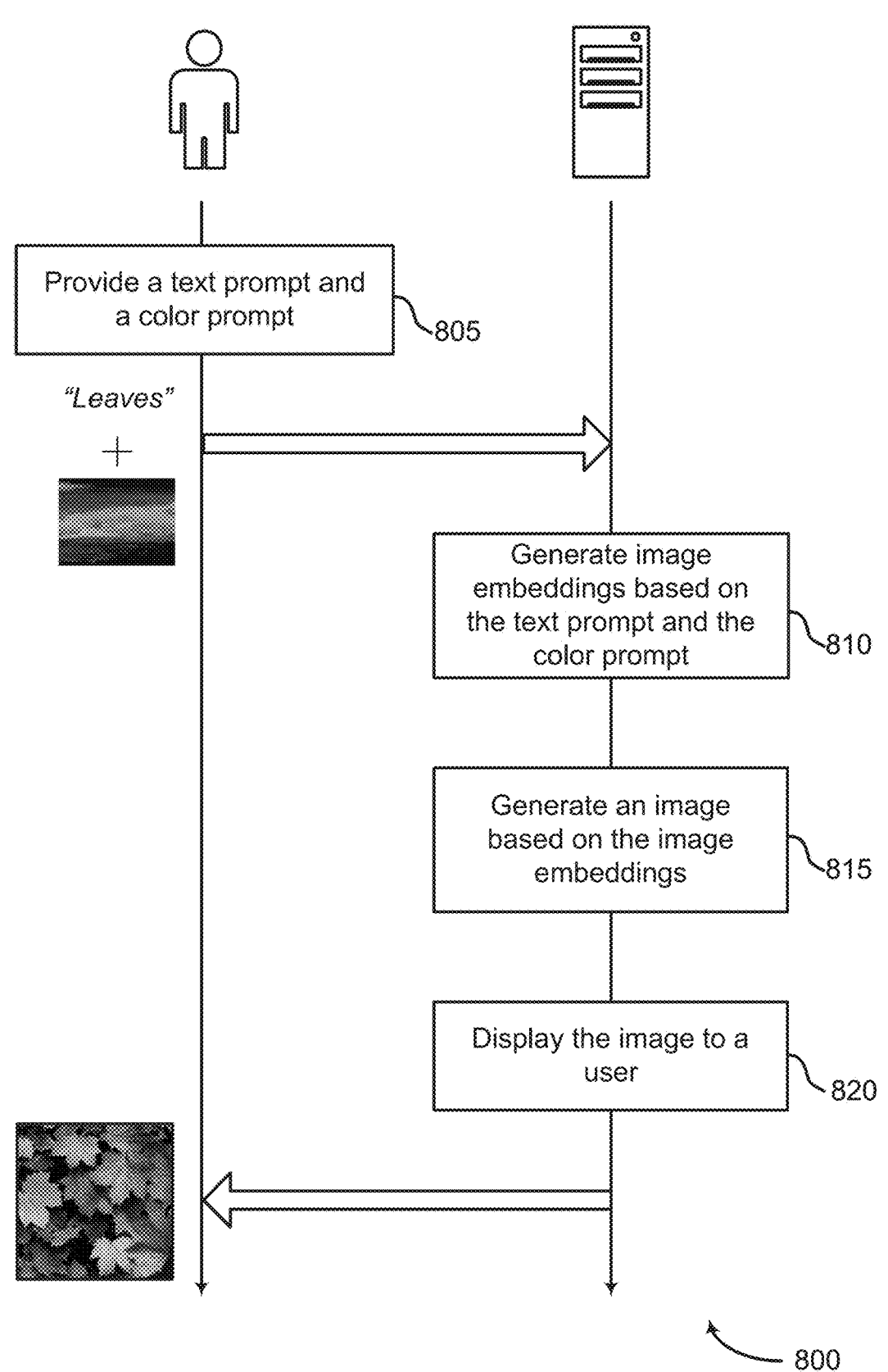
FIG. 8 shows an example of an image generation application according to aspects of the present disclosure.

FIG. 8 shows an example of an image generation application according to aspects of the present disclosure. In some examples, these operations of image generation process 800 are performed by a system including a processor executing a set of codes to control functional elements of an apparatus, such as image processing apparatus 200 described in FIG. 2. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the user provides a text prompt and a color prompt. In some cases, the operations of this step refer to, or may be performed by, a user as described with reference to FIG. 1. For example, text prompt "leaves" is input, e.g., via a user interface, to the image processing apparatus. Additionally, the color prompt (an image having yellow, orange, and black colors or color elements) is input to the image processing apparatus.

At operation 810, the system generates image embeddings based on the text prompt and the color prompt. In some cases, the operations of this step refer to, or may be performed by, an image processing apparatus as described with reference to FIGS. 1 and 2. In an embodiment, a multi-modal encoder of the image processing apparatus encodes the text prompt to generate a text embedding (text conditioning). A color encoder encodes the color prompt to generate a color embedding. The image processing apparatus concatenates the text embedding (text conditioning) and color embedding, and the concatenated embedding is input to a diffusion prior model. The diffusion prior model generates one or more image embeddings based on the text embedding and the color embedding. The image embedding includes shared attention weights of the text embedding and color embedding.

At operation 815, the system generates an image based on the image embeddings. In some cases, the operations of this step refer to, or may be performed by, an image processing apparatus as described with reference to FIGS. 1 and 2. In an embodiment, the image processing apparatus ranks a set of image embeddings and selects an image embedding from the set of image embeddings where the selected image embedding has a highest similarity score with regards to the text embedding in a common embedding space. The latent diffusion model generates an image based on the image embedding, where the generated image includes at least an element from the text prompt and at least a color from the color prompt.

At operation 820, the system displays the image to a user. In some cases, the operations of this step refer to, or may be performed by, an image processing apparatus as described with reference to FIGS. 1 and 2. The image processing apparatus displays an image depicting yellow/orange maple leaves to the user via a user interface implemented on a user device. In some examples, the user device is implemented on a mobile device or a desktop device (e.g., user device 105 described with reference to FIG. 1). In some cases, the image processing apparatus can be implemented on mobile devices or other electronic devices with limited storage and computation capacity.

Figure 9:
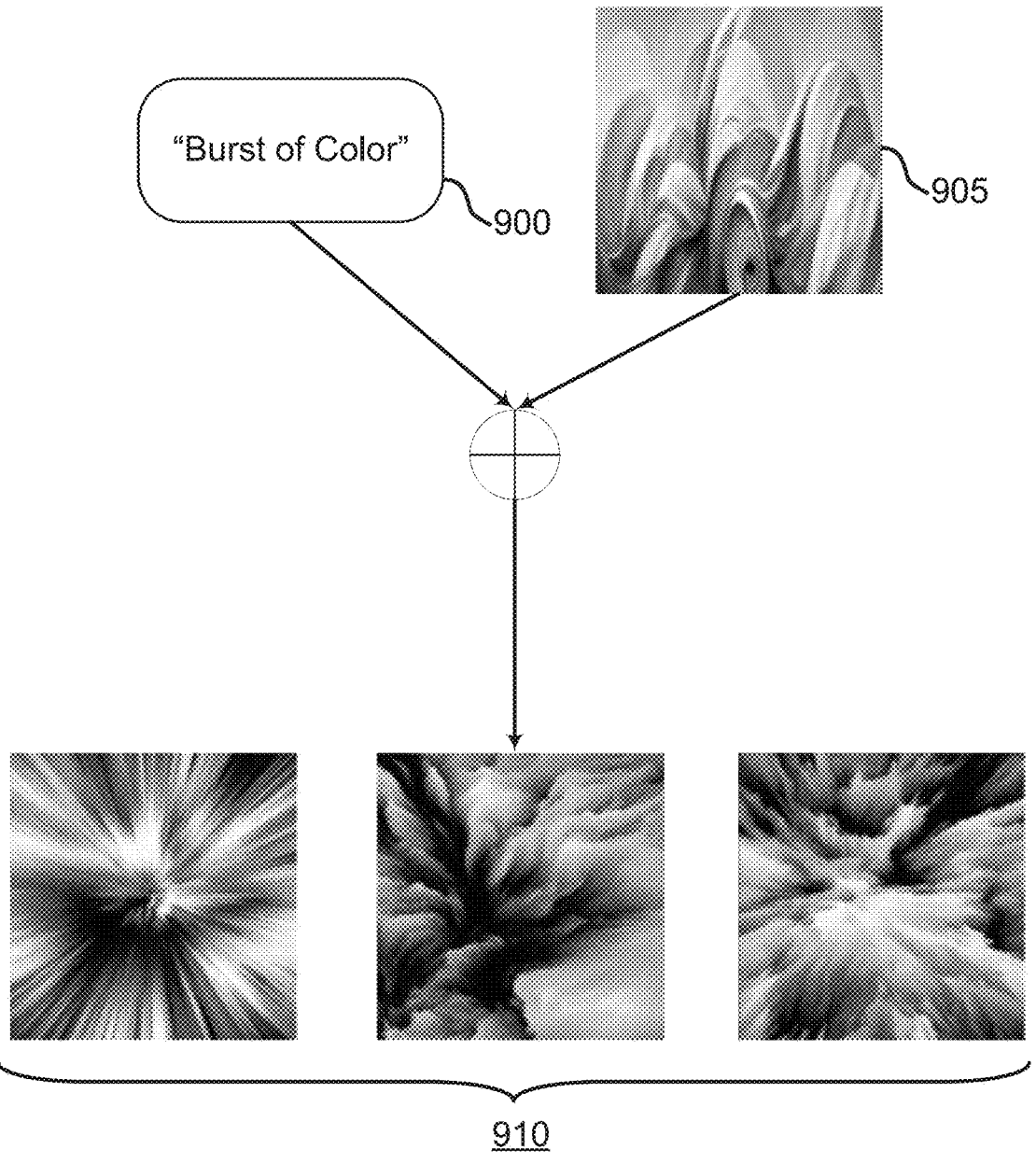
FIGS. 9 and 10 show examples of color conditioned image generation according to aspects of the present disclosure.

FIG. 9 shows an example of color conditioned image generation according to aspects of the present disclosure. The example shown includes text prompt 900, color prompt 905, and generated image(s) 910.

In an example shown in FIG. 9, text prompt 900 is "burst of color" and color prompt 905 is an image having various colors and shades. Image processing apparatus receives text prompt 900 and color prompt 905 as input. Image processing apparatus outputs generated image(s) 910 based on text prompt 900 and color prompt 905. For example, each of the generated images 910 includes at least one element of the text prompt 900 (e.g., description of "burst") and at least one of the various colors and shades from color prompt 905. The diffusion prior model of the image processing apparatus may generate one or more image embeddings based on text prompt 900 and color prompt 905, where the image embeddings are different from each other. As a result, generated images 910 are different from each other.

For example, in a user interface (UI), the image processing apparatus includes the color palettes associated with the color image by displaying the RGB values associated with the top five highest values in the color embedding. In some cases, the user interface includes a preset of N color palettes. When the user selects a color palette, the image processing apparatus provides a color image having the color palette as color conditioning, where the color image is input to the diffusion prior model. A user can edit the color palette by adding or removing a color.

Text prompt 900 is an example of, or includes aspects of, the corresponding element described with reference to FIGS. 3, 5, and 10. Color prompt 905 is an example of, or includes aspects of, the corresponding element described with reference to FIGS. 5 and 10. Generated image(s) is an example of, or includes aspects of, the corresponding element described with reference to FIG. 5.

Figure 10:
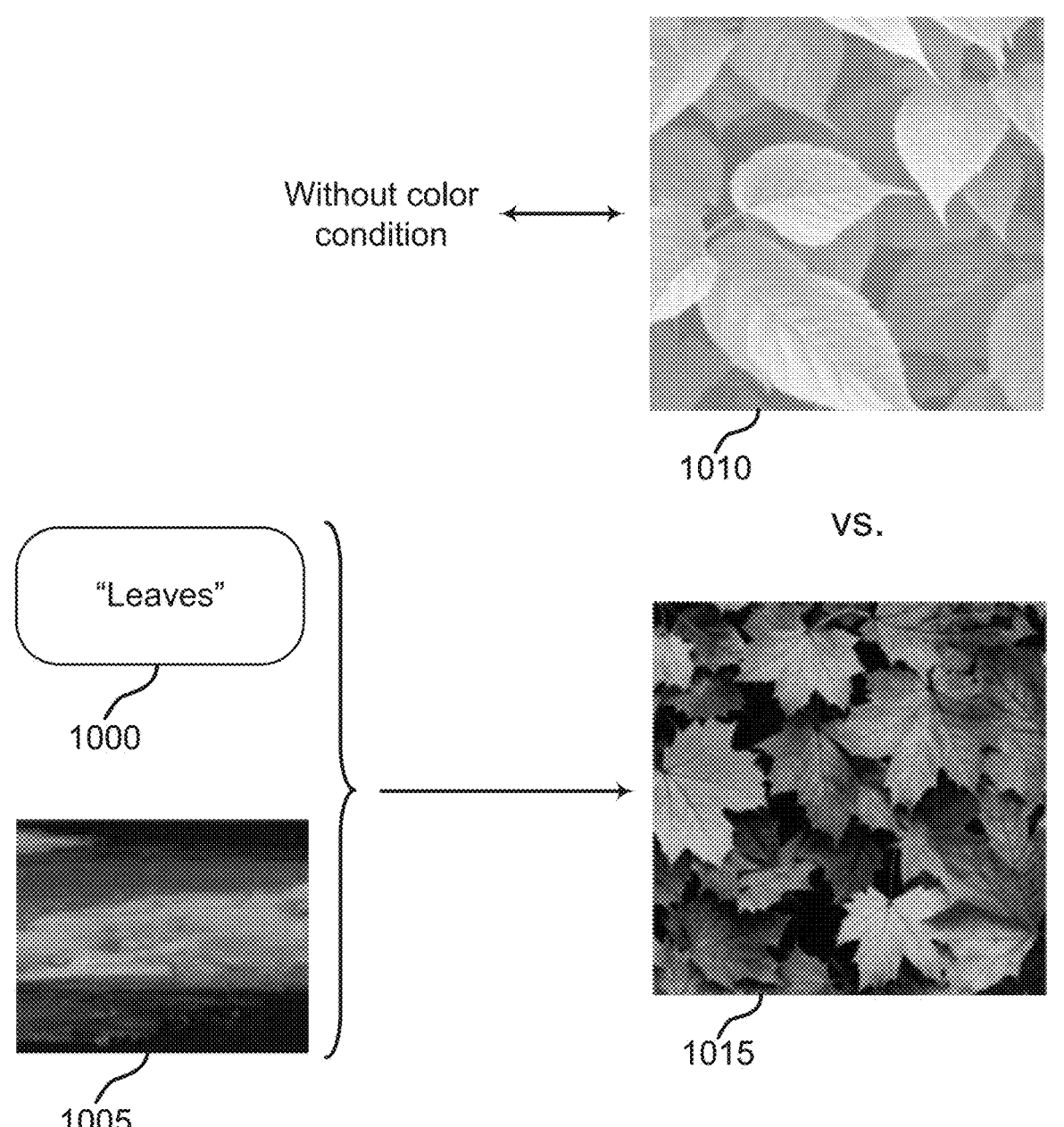

FIG. 10 shows an example of color conditioned image generation according to aspects of the present disclosure. The example shown includes text prompt 1000, color prompt 1005, first generated image 1010, and second generated image 1015.

In an example shown in FIG. 10, text prompt 1000 is "leaves" and color prompt 1005 includes yellow, orange, and black colors (or color patterns). Text prompt 1000 and color prompt 1005 are input to the image processing apparatus. The image processing apparatus generates second generated image 1015 based on text prompt 1000 and color prompt 1005. For example, when text prompt 1000 is input to the image processing apparatus without color prompt 1005, the diffusion prior model generates an image embedding based on text prompt 1000. The latent diffusion model generates first generated image 1010 based on the image embedding, where first generated image 1010 includes generic green leaf that is consistent with text prompt 1000. However, by conditioning text prompt 1000 with color prompt 1005, e.g., a color condition having yellow and/or orange colors, the latent diffusion model generates second generated image 1015 that depicts autumn/maple leaves, which semantically suits one or more colors from color prompt 1005. Second generated image 1015 includes semantics from text prompt 1000 and color prompt 1005.

In some cases, the color conditioning (e.g., color prompt 1005) is provided in the form of a color image. In some cases, when a color image is not provided, the image processing apparatus fills 0's vector as the color condition and the image processing apparatus generates images (e.g., first generated image 1010) based on text prompt 1000 (e.g., "leaves").

In an embodiment, the concatenation of the color embedding with the text token embeddings integrates the color embedding into the text token encodings as an additional proxy text encoding. Therefore, when the cross attention is calculated between the text encodings, the color embedding shares the attention weights. Accordingly, the image generation process semantically changes with the color condition based on the text input and color input (because the text input and color input are co-related). In some embodiments, the machine learning model has increased controllability over the color conditioning such that performing a separate classifier free guidance on the color conditioning is feasible.

For example, the color embeddings are modified to more or less the number of times as compared to text and image conditionings. Additionally or alternatively, the image processing apparatus incorporates color conditioning by training the diffusion prior model. Further detail on training the diffusion prior model is described with reference to FIG. 13.

Text prompt 1000 is an example of, or includes aspects of, the corresponding element described with reference to FIGS. 3, 5, and 9. Color prompt 1005 is an example of, or includes aspects of, the corresponding element described with reference to FIGS. 5 and 9.

Figure 11:
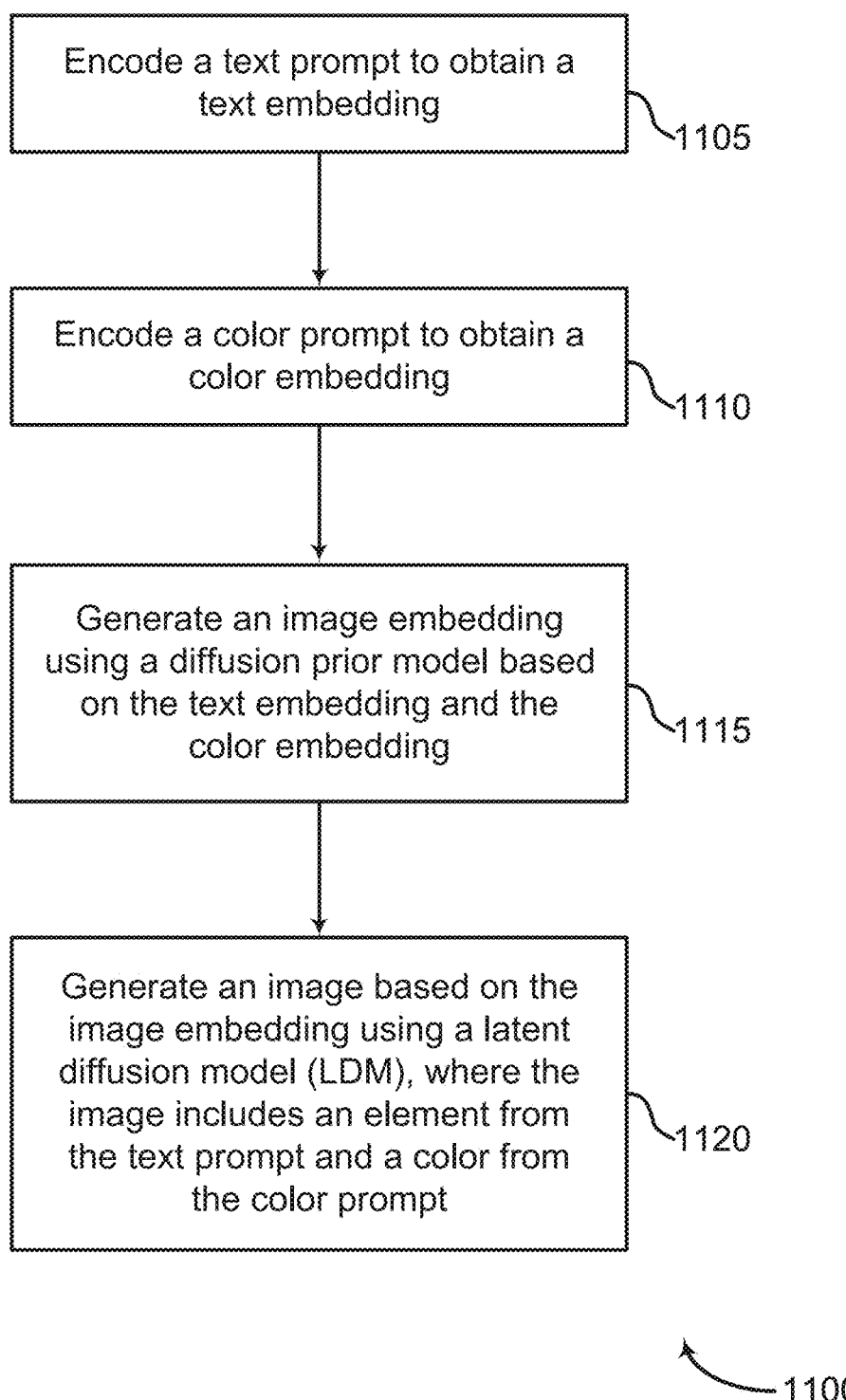
FIG. 11 shows an example of a method for image processing according to aspects of the present disclosure.

FIG. 11 shows an example of a method 1100 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system encodes a text prompt to obtain a text embedding. In some cases, the operations of this step refer to, or may be performed by, a multi-modal encoder as described with reference to FIGS. 2, and 5-7. According to an embodiment, the multi-modal encoder receives a text prompt and generates a text embedding based on the text prompt. The multi-modal encoder includes a CLIP model, but embodiments of the present disclosure may use or include a multi-modal model other than CLIP model.

At operation 1110, the system encodes a color prompt to obtain a color embedding. In some cases, the operations of this step refer to, or may be performed by, a color encoder as described with reference to FIGS. 2 and 5. In some examples, the color prompt is a color image. In some examples, the color embedding of the color prompt includes a color histogram.

In an embodiment, color encoder 520 with reference to FIG. 5 includes a color histogram extractor. To generate the color embedding(s) (may also be referred to as color histograms), machine learning model 500 with reference to FIG. 5 converts a color image (e.g., color prompt 510) in RGB space to LAB space. If two color vectors in the RGB space are close to each other (using L2 distance), the color vectors might not necessarily perceptually be close with respect to human color vision. Instead, LAB space is designed to be perceptually uniform with respect to human color vision, which refers to the same amount of numerical change in these values corresponding to about the same amount of visually perceived change. Therefore, machine learning model 500 uses 3D histograms in LAB space.

In an embodiment, machine learning model 500 uses a histogram size of [10, 8, 9] which generates a color embedding having a dimension size 720 (or a batch size of 1, 720). In some cases, the image embeddings and text CLIP embeddings have a dimension size 768. For the color embedding and text CLIP embedding to have the same embedding dimension, machine learning model 500 fills 48 0's to the color embedding to modify the color embedding to have a dimension size 768 (e.g., batch size of 1, 768). Then, the square root of each number in the feature vectors is taken to obtain the color embedding. In some cases, taking the square root can penalize the dominant color and give more weight to the other colors in the image.

According to an embodiment, a histogram embedding for the color condition can be used to disentangle color from the semantic structure of the color input image when used to generate the color palette.

At operation 1115, the system generates an image embedding using a diffusion prior model based on the text embedding and the color embedding. In some cases, the operations of this step refer to, or may be performed by, a diffusion prior model as described with reference to FIGS. 2, and 5-7. During inference, with a given sample, the machine learning model concatenates the color embedding (having batch_size of 1, 768) with the text embedding (e.g., token embeddings having batch_size of max_text_length, 768). For example, the resultant of the concatenation may yield a batch_size of max_text_length+1, 768. Similarly, other inputs such as the text CLIP embeddings (having batch_size 1, 768) with corresponding metadata information may be provided to the diffusion prior model in the same manner.

The concatenation of the color embedding with the text embedding integrates the color embedding into the text encodings as an additional proxy text encoding. Therefore, when the cross attention is calculated between the text encodings, the color embedding shares the attention weights. Accordingly, the image generation process semantically changes with the color condition based on the text input and color input. In some embodiments, the machine learning model may have controllability over the color conditioning by performing a classifier free guidance on the color conditioning. For example, the color embeddings may be modified to more or less the number of times as compared to text and image conditionings.

At operation 1120, the system generates an image based on the image embedding using a latent diffusion model (LDM), where the image includes an element from the text prompt and a color from the color prompt. In some cases, the operations of this step refer to, or may be performed by, a latent diffusion model as described with reference to FIGS. 2, 5, and 7. For example, the generated image includes semantics from the text prompt and the color prompt. By applying color conditioning, the semantics of the text prompt are altered. For example, the generated image changes from generic green leaves to yellow/orange maple leaves when a color image having yellow/orange color is input to a diffusion prior model as color conditioning. In some cases, the latent diffusion model is pre-trained.

Training and Evaluation

Figure 12:
FIG. 12 shows an example of a method for training a diffusion model according to aspects of the present disclosure.
Figure 14:
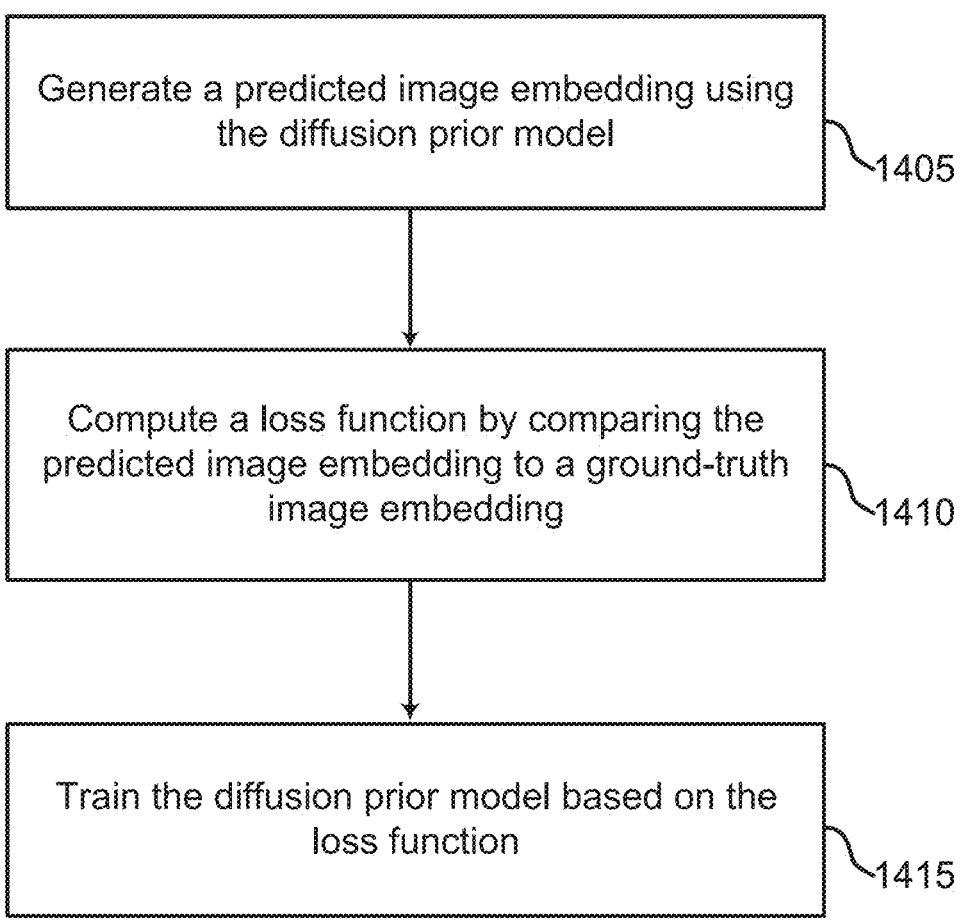

In FIGS. 12-14, a method, apparatus, and non-transitory computer readable medium for image processing are described. One or more embodiments of the method, apparatus, and non-transitory computer readable medium include obtaining training data including a text embedding and a color embedding; initializing a diffusion prior model; and training the diffusion prior model to generate an image embedding based on the text embedding and the color embedding, wherein the image embedding represents features corresponding to the text embedding and a color corresponding to the color embedding.

Some examples of the method, apparatus, and non-transitory computer readable medium further include encoding a text prompt describing a ground-truth image to obtain the text embedding. Some examples further include encoding the ground-truth image to obtain the color embedding. Some examples further include training a latent diffusion model to generate an image based on the image embedding.

Some examples of the method, apparatus, and non-transitory computer readable medium further include generating a predicted image embedding using the diffusion prior model. Some examples further include computing a loss function by comparing the predicted image embedding to a ground-truth image embedding, wherein the diffusion prior model is trained based on the loss function.

FIG. 12 shows an example of a method 1200 for training a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system initializes an untrained model. In some cases, the operations of this step refer to, or may be performed by, a training component as described with reference to FIG. 2. Initialization can include defining the architecture of the model and establishing initial values for the model parameters. In some cases, the initialization can include defining hyper-parameters such as the number of layers, the resolution and channels of each layer block, the location of skip connections, etc.

At operation 1210, the system adds noise to a training image using a forward diffusion process in N stages. In some cases, the operations of this step refer to, or may be performed by, a training component as described with reference to FIG. 2. In some cases, the forward diffusion process is a fixed process where Gaussian noise is successively added to an image. In latent diffusion models, the Gaussian noise may be successively added to features in a latent space.

At operation 1215, the system at each stage n, starting with stage N, predict image (or image features) at stage n−1 using a reverse diffusion process. In some cases, the operations of this step refer to, or may be performed by, a training component as described with reference to FIG. 2. For example, the reverse diffusion process can predict the noise that was added by the forward diffusion process, and the predicted noise can be removed from the image to obtain the predicted image. In some cases, an original image is predicted at each stage of the training process. Detail regarding reverse diffusion is provided in detail with reference to FIG. 3.

At operation 1220, the system compares the predicted image (or image features) at stage n−1 to an actual image (or image features) at stage n−1. In some cases, the operations of this step refer to, or may be performed by, a training component as described with reference to FIG. 2. For example, given observed data x, the diffusion model may be trained to minimize the variational upper bound of the negative log-likelihood −log $p_\theta(x)$ of the training data.

At operation 1225, the system updates parameters of the model based on the comparison. In some cases, the operations of this step refer to, or may be performed by, a training component as described with reference to FIG. 2. For example, parameters of a U-Net may be updated using gradient descent. Time-dependent parameters of the Gaussian transitions can also be learned.

FIG. 13 shows an example of a method 1300 for training a diffusion prior model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to some embodiments, the training component trains the diffusion prior model based on a color condition. Faster training and mapping of the combination of color prompt and text prompt to a corresponding image embedding can be achieved. The image embedding is used to generate an image, for example, a text prompt "leaves" with color condition having green color generates an image embedding which the image processing apparatus generates an image of generic green leaf based on the image embedding. However, by conditioning the text prompt with a color condition having orange and red colors, the image processing apparatus generates autumn/maple leaves that semantically suit the colors. In some cases, when provided with a color image including a vector image, for example, the colors are discrete, the generated image is a vector image having similar colors based on the prior mapping of discrete color histograms corresponding to vector images during training.

According to an embodiment, the color conditioning is optional and the color embeddings are modified to have 0's vector of the same dimension as the dimension of text prompt. For example, the modified color embedding is applied to the sampling process during training to train the machine learning model to turn on/off color conditioning.

At operation 1305, the system obtains training data including a text embedding and a color embedding. In some cases, the operations of this step refer to, or may be performed by, a training component as described with reference to FIG. 2. For example, the training data is stored in a database (described with reference to FIG. 1).

At operation 1310, the system initializes a diffusion prior model. In some cases, the operations of this step refer to, or may be performed by, a training component as described with reference to FIG. 2. Initialization establishes initial values for the model parameters. In some cases, initialization of a machine learning model includes defining hyper-parameters such as the number of layers, the resolution and channels of each layer block, the location of skip connections, etc.

At operation 1315, the system trains the diffusion prior model to generate an image embedding based on the text embedding and the color embedding, where the image embedding represents features corresponding to the text embedding and a color corresponding to the color embedding. In some cases, the operations of this step refer to, or may be performed by, a training component as described with reference to FIG. 2.

The machine learning model extracts color embeddings/histograms of the training samples with the same dimensions as the text embedding and image CLIP embedding. For example, a histogram size of [10,8,9] is used to generate a color histogram (or color embedding) having size 720 and the machine learning model is configured to fill or pad 48 0's to modify the color embedding to have a dimension of size 768, which is the same as the CLIP embeddings used to represent texts and images. In some cases, the machine learning model uses a histogram as the color condition. By removing the semantic information in the image, the mixing of semantics from the color image and the text prompt during inference time may be avoided.

According to some embodiments, the machine learning model may optionally include color conditioning. For example, during training, a sample (e.g., a color embedding of a color prompt) is input to the diffusion prior model two times. On the first time, the color embedding is input to the diffusion prior model. On the second time, the color embeddings are replaced with 0's vectors having a dimension of 768. For example, the 0's vectors may represent no color is provided to the machine learning model for the given sample. Additionally or alternatively, the color embeddings may be partially replaced with 0's vectors (e.g., 50% of values) during training. As a result, the machine learning model generates images with or without the color conditioning.

According to some embodiments, adding the color condition to training the prior model enables the machine learning model to map the color to a best latent image CLIP embedding. This further helps generate a more relevant image to the given text prompt and color prompt using a pre-trained LDM on image CLIP embeddings. The training methods described herein keep the color condition as optional, without affecting the quality of the generated images when the color condition is not used. Accordingly, the machine learning model provides increased control over the color palette of the images generated. The machine learning model may implicitly change the semantics of the image to suit the colors in the generated images.

FIG. 14 shows an example of a method 1400 for training a diffusion prior model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system generates a predicted image embedding using the diffusion prior model. In some cases, the operations of this step refer to, or may be performed by, a diffusion prior model as described with reference to FIGS. 2, and 5-7. For example, the predicted image embedding includes shared attention weights from the text embedding and the color embedding.

At operation 1410, the system computes a loss function by comparing the predicted image embedding to a ground-truth image embedding. In some cases, the operations of this step refer to, or may be performed by, a training component as described with reference to FIG. 2. For example, the loss function quantifies the error or discrepancy between the predicted image embedding and a ground-truth image embedding. During the training process, the machine learning model iteratively updates parameters of the diffusion prior model to minimize the loss function.

At operation 1415, the system trains the diffusion prior model based on the loss function. In some cases, the operations of this step refer to, or may be performed by, a training component as described with reference to FIG. 2. After training the diffusion prior model, when a color palette (e.g., color prompt) and a text prompt are input to a trained diffusion prior model, the diffusion prior model identifies nearest images in the search corpus, where the search corpus includes image embeddings corresponding to images in the search corpus. For example, the trained diffusion prior model identifies the nearest images using the cosine distance and/or dot product between the generated image embedding and image embeddings from the search corpus and sorting the embeddings based on their similarity scores. The details with reference to a training process of the diffusion prior model is described below.

In some examples, during training a diffusion prior model, a decoder-only Transformer is trained with a causal attention mask on a sequence including the text embedding, an embedding for the diffusion timestep, and a final embedding. The training component uses the output from the decoder-only Transformer to predict a de-noised image embedding. The training component further trains the diffusion prior model to predict the de-noised image embedding and calculates a loss using a mean-squared error (MSE) loss based on the prediction. In some cases, de-noised image embedding may also be referred to as an unnoised image embedding.

In an embodiment, the set of additional noise image embeddings are input to the latent diffusion model to generate image variations. The set of noise may include random noise, fixed pattern noise, banding noise, or any combination thereof.

In an embodiment, the diffusion prior model includes a diffusion-based mapping function which learns a target embedding when conditioned on a source embedding. At training, the training component conditions the diffusion prior model using a text embedding to predict a corresponding image embedding. The input conditioning may be replaced or augmented by other types of embedding, e.g., color embedding of the image from a color prompt, style embeddings of the image, tag embeddings along with the prompt text embedding to predict a corresponding image embedding.

For example, the set of predicted image embeddings and the text embedding are in a same embedding space. The set of predicted image embeddings and the text embedding share similar semantic information.

In an embodiment, the training component trains a decoder-only Transformer with a causal attention mask on a sequence including the CLIP text embedding, an embedding for the diffusion timestep and a final embedding whose output from the Transformer is used to predict the unnoised (or denoised) CLIP image embedding. This is implemented using a Unet architecture. The diffusion prior model is trained to predict the unnoised (or denoised) image embedding and is based on using a mean-squared error loss on this prediction.

During inference time, the diffusion prior model samples k different image embeddings and picks the image embedding that has high similarity score with respect to the text embedding of the text prompt.

Figure 15:
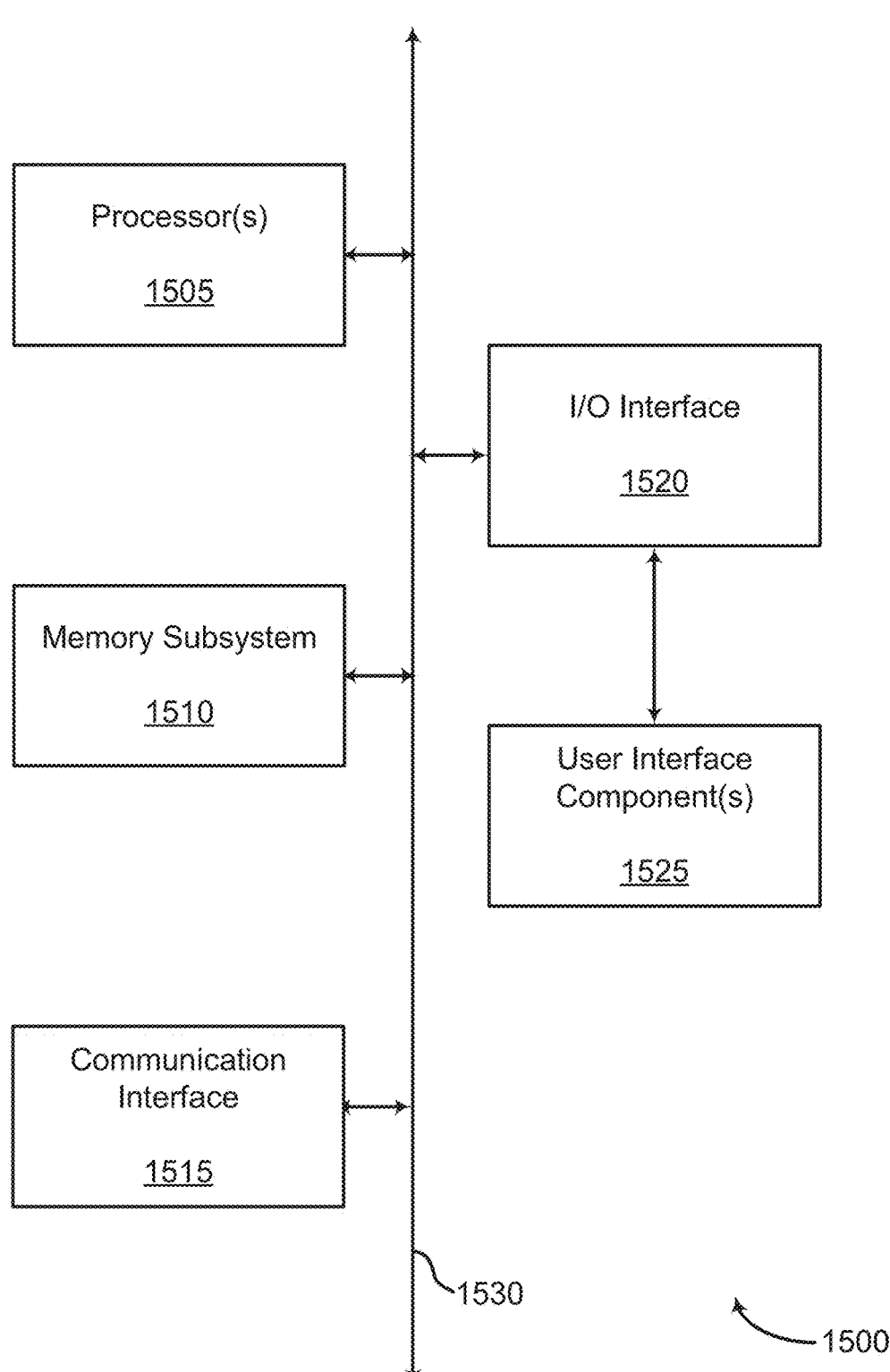
FIG. 15 shows an example of a computing device according to aspects of the present disclosure.

FIG. 15 shows an example of a computing device 1500 according to aspects of the present disclosure. The example shown includes computing device 1500, processor 1505, memory subsystem 1510, communication interface 1515, I/O interface 1520, user interface component 1525, and channel 1530.

In some embodiments, computing device 1500 is an example of, or includes aspects of, the image processing apparatus as described with reference to FIGS. 1 and 2. In some embodiments, computing device 1500 includes one or more processors 1505 that can execute instructions stored in memory subsystem 1510 to encode a text prompt to obtain a text embedding using a multi-modal encoder, encode a color prompt to obtain a color embedding using a color encoder, generate an image embedding based on the text embedding and the color embedding using a diffusion prior model, and generate an image based on the image embedding using a latent diffusion model, where the image includes an element from the text prompt and a color from the color prompt.

According to some aspects, computing device 1500 includes one or more processors 1505. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing. Processor(s) 1505 is an example of, or includes aspects of, the processor unit described with reference to FIG. 2.

According to some aspects, memory subsystem 1510 includes one or more memory devices. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1510 is an example of, or includes aspects of, the memory unit described with reference to FIG. 2.

According to some aspects, communication interface 1515 operates at a boundary between communicating entities (such as computing device 1500, one or more user devices, a cloud, and one or more databases) and channel 1530 and can record and process communications. In some cases, communication interface 1515 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1520 is controlled by an I/O controller to manage input and output signals for computing device 1500. In some cases, I/O interface 1520 manages peripherals not integrated into computing device 1500. In some cases, I/O interface 1520 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system(s). In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1520 or via hardware components controlled by the I/O controller.

According to some aspects, user interface component(s) 1525 enable a user to interact with computing device 1500. In some cases, user interface component(s) 1525 include an audio device, such as an external speaker system, an external display device such as a display screen, an input device (e.g., a remote-controlled device interfaced with a user interface directly or through the I/O controller), or a combination thereof. In some cases, user interface component(s) 1525 include a GUI.

Performance of apparatus, systems and methods of the present disclosure have been evaluated, and results indicate embodiments of the present disclosure have obtained increased performance over existing technology. Example experiments demonstrate that the image processing apparatus outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
encoding a text prompt to obtain a text embedding;
encoding a color prompt to obtain a color embedding, wherein the color prompt comprises a different modality than the text prompt;
generating an image embedding using a diffusion prior model based on the text embedding and the color embedding, wherein the image embedding represents the text prompt and the color prompt; and
generating an image by denoising a noise input based on the image embedding that represents the text prompt and the color prompt using a latent diffusion model (LDM), wherein the image includes an element from the text prompt and a color from the color prompt.

2. The method of claim 1, wherein:
the text embedding and the image embedding are in a multi-modal embedding space.

3. The method of claim 2, wherein:
the text embedding is in a first region of the multi-modal embedding space corresponding to text and the image embedding is in a second region of the multi-modal embedding space corresponding to images.

4. The method of claim 1, wherein generating the image embedding comprises:

performing an attention process using shared attention weights among the text embedding and the color embedding.

5. The method of claim 1, wherein:

the color embedding comprises a color histogram.

6. The method of claim 1, further comprising:

identifying a candidate image embedding for a candidate image;

comparing the image embedding to the candidate image embedding; and providing the candidate image as a search result based on the comparison.

7. The method of claim 1, further comprising:

generating a plurality of image embeddings based on the text embedding and the color embedding, wherein the image embedding is selected from the plurality of image embeddings.

8. The method of claim 7, further comprising:

generating a plurality of images based on the plurality of image embeddings, respectively, wherein each of the plurality of images includes the element from the text prompt and the color from the color prompt.

9. The method of claim 1, further comprising:

generating a plurality of images based on the image embedding, wherein each of the plurality of images includes the element from the text prompt and the color from the color prompt.

10. The method of claim 1, further comprising:

generating a modified image embedding using the LDM, wherein the image is generated based on the modified image embedding.

11. A method comprising:

obtaining training data including a text embedding representing a text prompt and a color embedding representing a color prompt, wherein the color prompt comprises a different modality than the text prompt;

initializing a diffusion prior model; and training the diffusion prior model to generate an image embedding based on the text embedding and the color embedding, wherein the image embedding represents features corresponding to the text embedding and a color corresponding to the color embedding, and wherein the image embedding represents the text prompt and the color prompt.

12. The method of claim 11, further comprising:

encoding the text prompt describing a ground-truth image to obtain the text embedding; and encoding the ground-truth image to obtain the color embedding.

13. The method of claim 11, further comprising:

training a latent diffusion model (LDM) to generate an image by denoising a noise input based on the image embedding that represents the text prompt and the color prompt.

14. The method of claim 11, further comprising:

generating a predicted image embedding using the diffusion prior model; and computing a loss function by comparing the predicted image embedding to a ground-truth image embedding, wherein the diffusion prior model is trained based on the loss function.

15. An apparatus comprising:

at least one processor; and at least one memory including instructions executable by the at least one processor to perform operations including:

encoding, using a multi-modal encoder, a text prompt to obtain a text embedding;

encoding, using a color encoder, a color prompt to obtain a color embedding, wherein the color prompt comprises a different modality than the text prompt;

generating, using a diffusion prior model, an image embedding based on the text embedding and the color embedding, wherein the image embedding represents the text prompt and the color prompt; and generating, using a latent diffusion model (LDM), an image by denoising a noise input based on the image embedding that represents the text prompt and the color prompt, wherein the image includes an element from the text prompt and a color from the color prompt.

16. The apparatus of claim 15, wherein:

the color encoder comprises a color histogram extractor configured to extract a color histogram from the color prompt.

17. The apparatus of claim 15, wherein:

the diffusion prior model comprises a transformer architecture.

18. The apparatus of claim 15, wherein:

the LDM comprises a U-Net architecture.

19. The apparatus of claim 15, wherein:

the LDM comprises an image decoder.

20. The apparatus of claim 15, further comprising:

a training component configured to train the diffusion prior model.

* * * * *